US009283736B2

(12) United States Patent
Breck

(10) Patent No.: US 9,283,736 B2
(45) Date of Patent: *Mar. 15, 2016

(54) MULTI-LAYER, ETHYLENE POLYMER-BASED FILMS WITH NOVEL POLYPROPYLENE BLEND-BASED STIFFENING LAYER

(75) Inventor: Alan Keith Breck, Kingston (CA)

(73) Assignee: LIQUI-BOX CORPORATION, Worthington, OH (US)

( * ) Notice: Subject to any disclaimer, the term of this patent is extended or adjusted under 35 U.S.C. 154(b) by 1307 days.

This patent is subject to a terminal disclaimer.

(21) Appl. No.: 13/086,579

(22) Filed: Apr. 14, 2011

(65) Prior Publication Data

US 2011/0252746 A1   Oct. 20, 2011

Related U.S. Application Data

(60) Provisional application No. 61/324,858, filed on Apr. 16, 2010.

(51) Int. Cl.
| B32B 27/08 | (2006.01) |
| B32B 27/32 | (2006.01) |
| B65B 9/20 | (2012.01) |

(52) U.S. Cl.
CPC . *B32B 27/32* (2013.01); *B65B 9/20* (2013.01); *Y10T 428/24959* (2015.01)

(58) Field of Classification Search
None
See application file for complete search history.

(56) References Cited

U.S. PATENT DOCUMENTS

| 3,645,992 | A | 2/1972 | Elston |
| 4,076,698 | A | 2/1978 | Anderson et al. |
| 4,503,102 | A | 3/1985 | Mollison |
| 4,521,437 | A | 6/1985 | Storms |
| 4,804,620 | A | 2/1989 | Tang et al. |
| 4,937,299 | A | 6/1990 | Ewen et al. |
| 5,206,075 | A | 4/1993 | Hodgson, Jr. |
| 5,288,531 | A | 2/1994 | Falla et al. |
| 5,292,392 | A | 3/1994 | Miller et al. |
| 5,360,648 | A | 11/1994 | Falla et al. |
| 5,364,486 | A | 11/1994 | Falla et al. |
| 5,453,318 | A | 9/1995 | Giacobbe |
| 5,462,777 | A | 10/1995 | Hayashida et al. |
| 5,508,051 | A | 4/1996 | Falla et al. |
| 5,538,590 | A | 7/1996 | Riley |
| 5,721,025 | A | 2/1998 | Falla et al. |
| 5,759,675 | A | 6/1998 | Hamada et al. |
| 5,879,768 | A | 3/1999 | Falla et al. |
| 5,942,579 | A | 8/1999 | Falla et al. |
| 5,972,443 | A | 10/1999 | Breck et al. |
| 5,972,486 | A | 10/1999 | Cometto et al. |
| 6,010,772 | A | 1/2000 | Perdomi et al. |
| 6,015,854 | A | 1/2000 | McCullough, Jr. |
| 6,086,967 | A | 7/2000 | Whiteman et al. |
| 6,117,465 | A | 9/2000 | Falla |
| 6,159,587 | A | 12/2000 | Perdomi |
| 6,172,172 | B1 | 1/2001 | Burgin et al. |
| 6,221,470 | B1 | 4/2001 | Ciocca et al. |
| 6,237,308 | B1 | 5/2001 | Quintin et al. |
| 6,256,966 | B1 | 7/2001 | Braun et al. |
| 6,406,765 | B1 | 6/2002 | Braun et al. |
| 6,416,833 | B1 | 7/2002 | Climenhage et al. |
| 6,525,138 | B2 | 2/2003 | Johoji et al. |
| 6,631,605 | B1 | 10/2003 | Quintin et al. |
| 6,638,636 | B2 | 10/2003 | Tucker |
| 6,767,599 | B2 | 7/2004 | Braun et al. |
| 6,795,053 | B1 | 9/2004 | Funamoto et al. |
| 6,872,462 | B2 | 3/2005 | Roberts et al. |
| 7,294,674 | B2 | 11/2007 | Pelliconi et al. |
| 8,440,280 | B2 | 5/2013 | Ronzani |
| 8,978,346 | B2 * | 3/2015 | Breck ............................. 53/451 |
| 2001/0028929 | A1 | 10/2001 | Breck et al. |
| 2001/0052304 | A1 | 12/2001 | Compton et al. |
| 2002/0006482 | A1 | 1/2002 | Falla et al. |
| 2004/0051189 | A1 | 3/2004 | Meier et al. |
| 2004/0071905 | A1 | 4/2004 | Demain |
| 2004/0146730 | A1 | 7/2004 | Holzer et al. |
| 2004/0157077 | A1 | 8/2004 | Roussos |
| 2005/0106344 | A1 | 5/2005 | Morris et al. |

(Continued)

FOREIGN PATENT DOCUMENTS

| CA | 2113455 | 2/1993 |
| CA | 2165340 | 1/1995 |

(Continued)

OTHER PUBLICATIONS

Lewis, F.C., "Form-Fill-Seal", Packaging Encyclopedia, pp. 185-188, 1987.
Wild, et al., Journal of Polymer Science, Poly, Phys. Ed., vol. 20, p. 441 (1982), L.D. Cady, "The Role of Commonomer Type and Distribution in Lldpe Product Performance," SPE.
International Search Report for PCT/CA2007/000717, dated Jul. 24, 2007.
International Search Report from PCT/CA2007/001563 dated Dec. 13, 2007.

(Continued)

*Primary Examiner* — Sheeba Ahmed
(74) *Attorney, Agent, or Firm* — Baker & Hostetler LLP

(57) ABSTRACT

This invention discloses a multi-layer film for making pouches for containing flowable materials, said multi-layer film comprising generally five layers in order: inner sealant-layer, first interposed layer, the core layer, second interposed layer, and the outer sealant layer. The sealant and core layers are ethylene-based, and the interposed layers are polypropylene-based. The multi-layer film thickness is in the range of from about 35 microns to about 66 microns. The interposed layers comprise a novel polypropylene blend with a major component polypropylene and a minor component polypropylene, wherein the minor component polypropylene is a heterogeneous polypropylene interpolymer with a density in the range of from about 0.875 to about 0.91 g/cm$^3$.

14 Claims, 11 Drawing Sheets

(56) References Cited

U.S. PATENT DOCUMENTS

| | | | |
|---|---|---|---|
| 2005/0124753 A1 | 6/2005 | Ashihara et al. |
| 2005/0131160 A1 | 6/2005 | Shimizu et al. |
| 2005/0147812 A1 | 7/2005 | Malfait et al. |
| 2006/0216488 A1 | 9/2006 | Schell et al. |
| 2006/0228502 A1 | 10/2006 | Bekele |
| 2006/0246280 A1 | 11/2006 | Chambliss et al. |
| 2007/0088129 A1 | 4/2007 | Jacobsen et al. |
| 2007/0252276 A1 | 11/2007 | Lloyd-George |
| 2007/0254119 A1 | 11/2007 | Lloyd-George |
| 2007/0269623 A1 | 11/2007 | Breck |
| 2008/0050545 A1 | 2/2008 | Harvey |
| 2008/0090062 A1 | 4/2008 | Breck |
| 2011/0033135 A1 | 2/2011 | Breck |
| 2011/0033644 A1 | 2/2011 | Breck |
| 2011/0258969 A1 | 10/2011 | Breck |

FOREIGN PATENT DOCUMENTS

| | | |
|---|---|---|
| CA | 2151589 | 4/1995 |
| CA | 2182524 | 8/1995 |
| CA | 2190004 | 11/1995 |
| CA | 2205172 | 3/1997 |
| CA | 2231449 | 4/1997 |
| CA | 2239579 | 6/1997 |
| CA | 2280910 | 8/1998 |
| CA | 2411183 | 5/2004 |
| CA | 2512041 | 8/2004 |
| CA | 2526873 | 12/2004 |
| EP | 0351744 | 1/1990 |
| EP | 1059326 | 12/2000 |
| EP | 1391295 | 2/2004 |
| WO | WO 95/26268 | 10/1995 |
| WO | WO 97/20693 | 6/1997 |
| WO | WO 98/34776 | 8/1998 |
| WO | WO 01/53079 | 7/2001 |

OTHER PUBLICATIONS

Supplementary European Search Report for EP07719643, dated Jun. 10, 2009.
Plastics Focus, vol. 25, No. 12, Jun. 21, 1993, 25(12), 6 pages.
Randall, "Sequence Distributions Versus Catalyst Site Behavior of in Situ Blends of Polypropylene and Poly(ethylene-co-propylene)", Journal of Polymer Science: Part A: Poly Chemistry, 1998, 36, 1527-1542.
International Patent Application No. PCT/US2011/032409: International Search Report dated Dec. 7, 2011, 3 pages.
International Patent Application No. PCT/US2011/032412: International Search Report dated Dec. 7, 2011, 3 pages.
International Patent Application No. PCT/US2011/032452: International Search Report dated Dec. 7, 2011, 2 pages.
U.S. Appl. No. 13/086,557: Non-Final Rejection, dated Dec. 18, 2014, 11 pages.

* cited by examiner

MULTI-LAYER, ETHYLENE POLYMER-BASED FILMS WITH NOVEL POLYPROPYLENE BLEND-BASED STIFFENING LAYER

CROSS-REFERENCE TO RELATED APPLICATION

This application claims the benefit of U.S. Provisional Application No. 61/324,858 filed Apr. 16, 2010, which is incorporated by reference herein in its entirety.

FIELD OF INVENTION

The present invention relates to ethylene polymer-based multi-layer films with improved stiffness and clarity. This invention also relates to pouches for containing flowable materials made from such multi-layer films. This invention further relates to a process for making such multi-layer films. More specifically, the present invention relates to films that have a novel polypropylene blend localized closer to the outside layer of the multi-layer film such that the multi-layer film maintains its mechanical integrity but at the same time is thinner in gauge than currently available films. In one aspect, the present invention relates to packaging flowable materials such as milk, in pouches using, for example, a so-called vertical form, fill, and seal ("VFFS") apparatus.

BACKGROUND

In the VFFS apparatus, in the first step, a flat web of synthetic thermoplastic film is unwound from a roll and formed into a continuous tube in a tube-forming section. In the next step, the longitudinal edges of the film are sealed together to form a so-called "lap seal" or "fin seal." The tube is pulled vertically downwards to a filling station and collapsed across its transverse cross-section at a sealing device below the filling station. The transverse heat seal at the collapsed portion of the tube makes an air-tight seal.

Next, the material being packaged enters the tube above the transverse heat seal in a continuous or intermittent manner and fills the tube upwards from the transverse heat seal. The tube is then allowed to drop a predetermined distance usually under the influence of the weight of the material in the tube. The jaws of the sealing device close again and collapse the tube at a second transverse section. Depending upon the nature of the material being packaged and the mode of operation of the process the sealing device transversely seals and severs the tube at the second transverse cross-section which may be at, above, or below the air/material interface in the tube.

The material-filled portion of the tube is now in the form of a pillow shaped pouch. The sealing device, thus, has sealed the top of the filled pouch, sealed the bottom of the next-to-be-formed pouch and separated the filled pouch from the next-to-be-formed pouch, all in one operation.

One VFFS apparatus of the type described above is a Prepac® IS-7E liquid packaging apparatus. A commonly used sealing device, the so-called impulse sealer, has electrically insulated sealing element mounted in the sealing jaws. In operation, the sealing jaws close and simultaneously an electrical current flows through the sealing element, for example, a wire. The jaws remain closed while the seal forms, but not while it cools and solidifies. Therefore, once the sealing jaws open, the synthetic thermoplastic film must provide a molten transverse seal that supports the weight of the flowable material, for example, liquid, in the next-to-be-formed pouch.

For reasons of economy, customers are demanding thinner and thinner films for the pouching of fluids. This can lead to one of two problems in commercially available film formulations: (1) inadequate sealability and toughness, or (2) insufficient stiffness.

Pouches made from commercially available films tend to suffer from defective seals, that is, a tendency to have weak transverse end and/or longitudinal seals even though the operating conditions of the impulse sealer have been optimized. Defective seals may lead to the phenomenon known as "leakers," in which the flowable material, for example, milk, may escape from the pouch through pinholes that develop at, or close, to the seal. It has been estimated that leakers account for about 1-2% of the 1.3 liter milk pouch production.

As the pouch film is down-gauged for reasons of economy, its stiffness may also become an issue. Lack of stiffness may adversely affect the runnability of the film on a form, fill and seal apparatus and give poor stand-up properties for pouches in, for instance, a milk pitcher. However, higher stiffness has traditionally required a thicker gauge of the pouch film. But thicker gauge requires more material. The present invention, by localizing the stiffening material towards the outside of the multi-layer film, addresses both these issues in that the stiffness of the multi-layer film is not adversely affected even when its gauge thickness is reduced.

SUMMARY OF INVENTION

The present invention relates to a multi-layer film for making pouches for containing flowable materials, said multi-layer film comprising the following layers in order, from an at least one inner sealant-layer to an at least one outer sealant-layer:

(A) said at least one inner sealant-layer comprising polyethylene that is selected from the group consisting of:
  (i) an at least one low-density ethylene-alpha-olefin copolymer,
  (ii) a blend of said at least one low-density ethylene-alpha-olefin copolymer and an at least one ethylene homopolymer, wherein said ethylene homopolymer is made in a high-pressure polymerization process; and
  (iii) a blend of said at least one low-density ethylene-alpha-olefin copolymer and an at least one ethylene copolymer, wherein said ethylene copolymer is made in a high-pressure polymerization process;

(B) a first at least one interposed layer adjacent to said at least one inner sealant-layer, said first at least one interposed layer comprising:
  (i) an at least one polypropylene blend comprising a major component polypropylene and a minor component polypropylene, wherein said major component polypropylene in the range of from about 50% to 90% of weight of said first at least one interposed layer, and said minor component polypropylene is in the range of from about 10% to about 49% of weight of said first at least one interposed layer;
  (ii) optionally, an at least one ethylene-alpha-olefin copolymer; and
  (iii) optionally, a second ethylene-alpha-olefin copolymer that is not the same as said at least one ethylene-alpha-olefin copolymer in (B)(ii);
  wherein the centerline of said first at least one interposed layer is closer to the centerline of said at least one inner sealant-layer than to the centerline of said multi-layer film;

(C) at least one core layer, adjacent to said first at least one interposed layer, said at least one core layer comprising polyethylene that is selected from the group consisting of:
  (i) at least one low-density ethylene-alpha olefin copolymer,
  (ii) a blend of said at least one low-density ethylene-alpha-olefin copolymer and an at least one ethylene homopolymer, wherein said ethylene homopolymer is made in a high-pressure polymerization process; and
  (iii) a blend of said at least one low-density ethylene-alpha-olefin copolymer and an at least one ethylene copolymer, wherein said ethylene copolymer is made in a high-pressure polymerization process;
(D) a second at least one interposed layer adjacent to said at least one core layer, said second at least one interposed layer comprising:
  (i) an at least one polypropylene blend comprising a major component polypropylene and a minor component polypropylene, wherein said major component polypropylene in the range of from about 50% to 90% of weight of said first at least one interposed layer, and said minor component polypropylene is in the range of from about 10% to about 49% of weight of said first at least one interposed layer;
  (ii) optionally, an at least one ethylene-alpha-olefin copolymer; and
  (iii) optionally, a second ethylene-alpha-olefin copolymer that is not the same as said at least one ethylene-alpha-olefin copolymer in (D)(ii);
  wherein the centerline of said second at least one interposed layer is closer to the centerline of said at least one outer sealant-layer than to the centerline of said multi-layer film; and
(E) said at least one outer sealant-layer, comprising polyethylene that is selected from the group consisting of:
  (i) an at least one low-density ethylene-alpha-olefin copolymer,
  (ii) a blend of said at least one low-density ethylene-alpha-olefin copolymer and an at least one ethylene homopolymer, wherein said ethylene homopolymer is made in a high-pressure polymerization process; and
  (iii) a blend of said at least one low-density ethylene-alpha-olefin copolymer and an at least one ethylene copolymer, wherein said ethylene copolymer is made in a high-pressure polymerization process;
  wherein said multi-layer film thickness is in the range of from about 35 microns to about 66 microns;
  wherein a combined thickness of said first at least one interposed layer and said second at least one interposed layer is in the range of from about 10% to about 27% of the total thickness of said multi-layer film;
  wherein a combined thickness of said inner sealant-layer and said outer sealant-layer is in the range of from about 10% to about 27% of the total thickness of said multi-layer film; and This invention also relates to a process for making pouches filled with a flowable material, using a vertical form, fill and seal apparatus, wherein each pouch is made from a flat web of film by the following steps:
(I) forming a tubular film therefrom with a longitudinal seal and subsequently flattening said tubular film at a first position;
(II) transversely heat-sealing said tubular film at the flattened position;
(III) filling said tubular film with a predetermined quantity of flowable material above said first position;
(IV) flattening said tubular film above the predetermined quantity of flowable material at a second position; and
(V) transversely heat sealing said tubular film at said second position,
wherein said pouches are made from a flat web of film made from a multi-layer film, comprising the following layers in order of an at least one inner sealant-layer to an at least one outer sealant-layer:
(A) said at least one inner sealant-layer comprising polyethylene that is selected from the group consisting of:
  (i) an at least one low-density ethylene-alpha-olefin copolymer,
  (ii) a blend of said at least one low-density ethylene-alpha-olefin copolymer and an at least one ethylene homopolymer, wherein said ethylene homopolymer is made in a high-pressure polymerization process; and
  (iii) a blend of said at least one low-density ethylene-alpha-olefin copolymer and an at least one ethylene copolymer, wherein said ethylene copolymer is made in a high-pressure polymerization process;
(B) a first at least one interposed layer adjacent to said at least one inner sealant-layer, said first at least one interposed layer comprising:
  (i) an at least one polypropylene blend comprising a major component polypropylene and a minor component polypropylene, wherein said major component polypropylene in the range of from about 50% to 90% of weight of said first at least one interposed layer, and said minor component polypropylene is in the range of from about 10% to about 49% of weight of said first at least one interposed layer;
  (ii) optionally, an at least one ethylene-alpha-olefin copolymer; and
  (iii) optionally, a second ethylene-alpha-olefin copolymer that is not the same as said at least one ethylene-alpha-olefin copolymer in (B)(ii);
  wherein the centerline of said first at least one interposed layer is closer to the centerline of said at least one inner sealant-layer than to the centerline of said multi-layer film;
(C) at least one core layer, adjacent to said first at least one interposed layer, said at least one core layer comprising polyethylene that is selected from the group consisting of:
  (i) at least one low-density ethylene-alpha olefin copolymer,
  (ii) a blend of said at least one low-density ethylene-alpha-olefin copolymer and an at least one ethylene homopolymer, wherein said ethylene homopolymer is made in a high-pressure polymerization process; and
  (iii) a blend of said at least one low-density ethylene-alpha-olefin copolymer and an at least one ethylene copolymer, wherein said ethylene copolymer is made in a high-pressure polymerization process;
(D) a second at least one interposed layer adjacent to said at least one core layer, said second at least one interposed layer comprising:
  (i) an at least one polypropylene blend comprising a major component polypropylene and a minor component polypropylene, wherein said major component polypropylene in the range of from about 50% to 90% of weight of said first at least one interposed layer, and said minor component polypropylene is in the range of from about 10% to about 49% of weight of said first at least one interposed layer;
  (ii) optionally, an at least one ethylene-alpha-olefin copolymer; and (iii) optionally, a second ethylene-alpha-olefin copolymer that is not the same as said at least one ethylene-alpha-olefin copolymer in (D)(ii);

wherein the centerline of said second at least one interposed layer is closer to the centerline of said at least one outer sealant-layer than to the centerline of said multi-layer film; and (E) said at least one outer sealant-layer, comprising polyethylene that is selected from the group consisting of:

(i) an at least one low-density ethylene-alpha-olefin copolymer, (ii) a blend of said at least one low-density ethylene-alpha-olefin copolymer and an at least one ethylene homopolymer, wherein said ethylene homopolymer is made in a high-pressure polymerization process; and (iii) a blend of said at least one low-density ethylene-alpha-olefin copolymer and an at least one ethylene copolymer, wherein said ethylene copolymer is made in a high-pressure polymerization process;

wherein said multi-layer film thickness is in the range of from about 35 microns to about 66 microns;

wherein a combined thickness of said first at least one interposed layer and said second at least one interposed layer is in the range of from about 10% to about 27% of the total thickness of said multi-layer film;

wherein a combined thickness of said inner sealant-layer and said outer sealant-layer is in the range of from about 10% to about 27% of the total thickness of said multi-layer film; and

DESCRIPTION OF THE INVENTION

Definitions

Figure 1A:
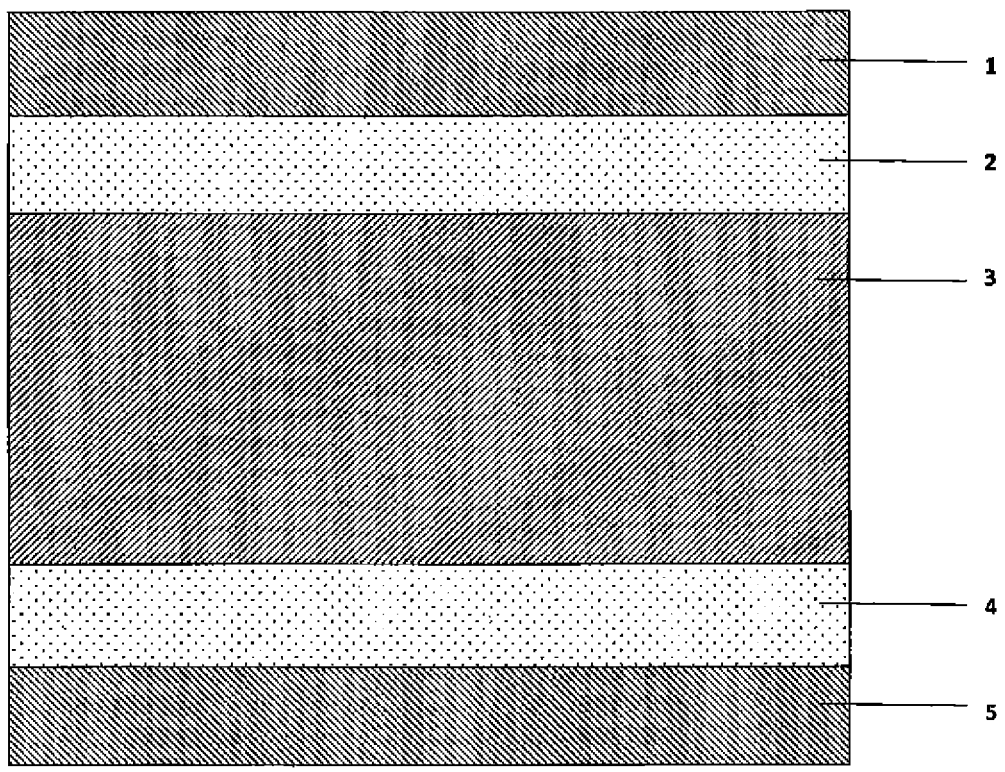
FIG. 1 shows a general schematic of the multi-layer film of the present invention.

All percentages expressed in the present patent application are by weight of the total weight of the composition unless expressed otherwise.

All ratios expressed in this patent application are on a weight:weight basis unless expressed otherwise.

In this patent application, ranges are used as shorthand only to avoid listing and describing each and every value within the range. Any appropriate value within the range can be selected as the upper value, the lower value, or the end-point of the range.

In this patent application, the singular form of a word includes its plural, and vice versa, unless the context clearly dictates otherwise. Thus, references "a," "an," and "the" generally include the plurals of the respective terms they qualify. For example, reference to "a method" includes its plural—"methods." Similarly, the terms "comprise," "comprises," and "comprising," whether used as a transitional phrase in the claims or otherwise, should be interpreted inclusively rather than exclusively. Likewise the terms "include," "including," and "or" should be construed to be inclusive, unless such a construction is clearly prohibited from the context. Similarly, the term "examples," particularly when followed by a listing of terms, is merely exemplary and illustrative and should not be deemed to be exclusive or comprehensive.

The methods, compositions, and other advances disclosed in this patent application are not limited to particular methodology, protocols, and reagents described in the application because, as the skilled artisan will appreciate, they may vary. Further, the terminology used in this application describes particular embodiments only, and should not be construed as limiting the scope of what is disclosed or claimed.

Unless defined otherwise, all technical and scientific terms, terms of art, and acronyms used in the present application have the meanings commonly understood by one of ordinary skill in the art in the field(s) of the invention, or in the field(s) where the term is used. Although any compositions, methods, articles of manufacture, or other means or materials similar or equivalent to those described in the present patent application can be used in the practice of the present invention, specific compositions, methods, articles of manufacture, or other means or materials are described only for exemplification.

All patents, patent applications, publications, technical and/or scholarly articles, and other references cited or referred to in this patent application are incorporated in their entirety by reference to the extent allowed by law. The discussion of those references is intended merely to summarize the assertions made in these references. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

General Invention

As used herein, the term "flowable material" does not include gaseous materials, but encompasses materials which are flowable under gravity or may be pumped. Such materials include liquids, for example, milk, water, fruit juice, oil; emulsions, for example, ice cream mix, soft margarine; pastes, for example, meat pastes, peanut butter; preserves, for example, jams, pie fillings, marmalade; jellies; doughs; ground meat, for example, sausage meat; powders, for example, gelatin powders, detergents; granular solids, for example, nuts, sugar; and like materials. The invention described herein is particularly useful for flowable foods such as milk. In addition, as used herein "density" is determined by ASTM Procedure D1505-85, "stiffness" is understood to be tensile modulus of elasticity as measured by ASTM Procedure D882-91 (Method A) and "melt-index" by ASTM Procedure D1238-90B (Condition E for polyethylenes and Condition L for most polypropylenes). The "melting point" of a polymer is measured as the peak melting point when performing differential scanning calorimetry (DSC) as described in ASTM Procedure D3417-83 (rev. 88).

In one embodiment, this invention relates to polyethylene-based multi-layer films usable for pouch-making for containing of flowable materials. More specifically, this invention provides a multi-layer film that is lower in gauge (thickness) but retains an adequate combination of stiffness and toughness for its use in pouches for flowable materials.

Figure 1B:
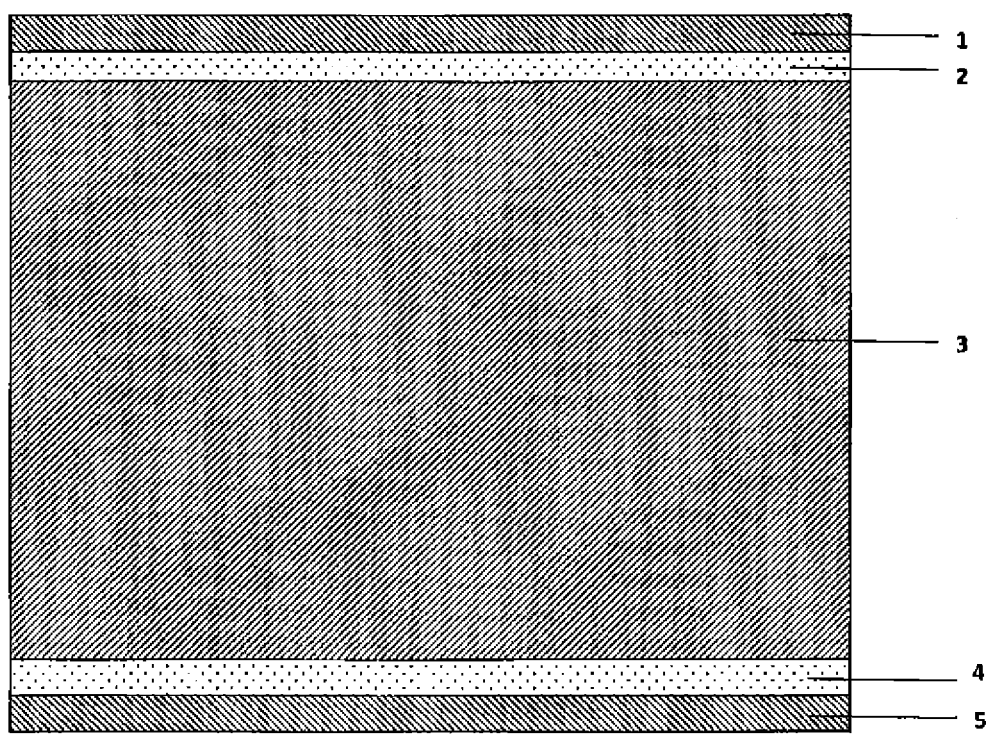

In one embodiment, the polyethylene-based multi-layer film comprises five layers: an inner sealant-layer, a first interposed layer, a core layer, a second interposed layer, and the outer sealant-layer. The interposed layer comprises a stiff polymer—polypropylene blend ("blend PP"). Moreover, a combined thickness of the first and the second interposed layer is in the range of from about 10% to about 27% of the total thickness of the multi-layer film. Similarly, a combined thickness of the inner and outer sealant-layers is also in the range of from about 10% to about 27% of the total thickness of the multi-layer film. Stated another way, the core layer thickness ranges from about 46% (See FIG. 1A) to about 80% (see FIG. 1B) of the total thickness of the multi-layer film. Because generally, the blend PP is localized in the interposed layer and not distributed across the multi-layer film of the present invention, and because of the range limitations on the sealant layers and the interposed layers, the blend PP resides much closer to the center-line of the inner and the outer sealant-layers than to the centerline of the multi-layer film. As a result, the multi-layer film of the present invention provides a lower-gauge film but with performance substantially similar to higher-gauge films. A blend PP film cannot be used on its own for fluid packaging because, for example, it lacks the required sealing properties. Moreover, if the blend PP is distributed throughout the pouch-making film, it renders the film hazy and unclear. However, clear film is desired for example for making milk pouches. The present invention thus addresses all these issues.

Because polypropylene and polyethylene can be mutually incompatible and fail to form a sufficiently dispersed phase, the invention at hand uses the polypropylene blend compositions described infra—particularly, the second component, generally comprising polypropylene interpolymers ("PI"), helps with compatibilization between the polypropylene and polyethylene. The presence of the second component in the polypropylene blend effectively compatibilizes polypropylene with polyethylene phases in the co-extruded film so that the two polymers (polypropylene and polyethylene) adhere adequately to each other, even without the use of functional compatibilizing polymer such as ethylene methylacrylate copolymer.

It is to be noted that functional polymers such as ethylene methylacrylate copolymer may compatibilize polyethylene and polypropylene, but by their very nature are less inert, and more likely to change due to chemical reactions than are polyethylene and polypropylene. Their useful shelf life can be shorter. They also have more affinity to metals, which can have negative consequences in an extrusion system. The functional polymers are more likely to form gels than are polyethylene and polypropylene, and generally harder to flush out cleanly at the end of a production run. Also, functional polymers are more likely to cause taste and odor issues, when they are components of food packages, particularly liquid food packages where the inner surface is intimately wetted, than are polyethylene and polypropylene.

This invention also relates to a process for making such multi-layer films and to pouches made from such multi-layer films.

More specifically, in one embodiment, the present invention relates to a polyethylene-based multi-layer film that is from about 35 microns to about 66 microns thick, for making pouches for containing flowable materials. The multi-layer film comprises the following layers: an at least one inner sealant-layer, a first at least one interposed layer, an at least one core layer, a second at least one interposed layer, and an at least one outer sealant-layer, in order, from an at least one inner sealant-layer to an at least one outer sealant-layer; wherein:

(A) said at least one inner sealant-layer and/or said at least one outer sealant-layer comprises polyethylene that is selected from the group consisting of:
  (i) an at least one low-density ethylene-alpha-olefin copolymer,
  (ii) a blend of said at least one low-density ethylene-alpha-olefin copolymer and an at least one ethylene homopolymer, wherein said ethylene homopolymer is made in a high-pressure polymerization process; and
  (iii) a blend of said at least one low-density ethylene-alpha-olefin copolymer and an at least one ethylene copolymer, wherein said ethylene copolymer is made in a high-pressure polymerization process;
  wherein a combined thickness of said inner sealant-layer and said outer sealant-layer is in the range of from about 10% to about 27% of the total thickness of said multi-layer film;

(B) the first and/or the second at least one interposed layer is adjacent to said at least one inner sealant-layer or outer sealant-layer, respectively, and said first and/or the second at least one interposed layer comprises:
  (i) an at least one polypropylene blend comprising a major component polypropylene and a minor component polypropylene, wherein said major component polypropylene in the range of from about 50% to 90% of weight of said first and/or said at least one interposed layer, and said minor component polypropylene is in the range of from about 10% to about 49% of weight of said first and/or said second at least one interposed layer;
  (ii) optionally, an at least one ethylene-alpha-olefin copolymer; and
  (iii) optionally, a second ethylene-alpha-olefin copolymer that is not the same as said at least one ethylene-alpha-olefin copolymer in (B)(ii);
  wherein the centerline of said first and/or the second at least one interposed layer is closer to the centerline of said at least one inner sealant-layer or at least one outer sealant layer, respectively, than to the centerline of said multi-layer film;
  wherein a combined thickness of said first at least one interposed layer and said second at least one interposed layer is in the range of from about 10% to about 27% of the total thickness of said multi-layer film; and
and
(C) said at least one core layer, adjacent to said first at least one interposed layer, comprises polyethylene that is selected from the group consisting of:
  (i) at least one low-density ethylene-alpha olefin copolymer, (ii) a blend of said at least one low-density ethylene-alpha-olefin copolymer and an at least one ethylene homopolymer, wherein said ethylene homopolymer is made in a high-pressure polymerization process; and (iii) a blend of said at least one low-density ethylene-alpha-olefin copolymer and an at least one ethylene copolymer, wherein said ethylene copolymer is made in a high-pressure polymerization process.

In a preferred embodiment, the multi-layer film thickness is in the range of from about 38 microns to about 63 microns. In a further preferred embodiment, the multi-layer film thickness is in the range of from about 44 microns to about 60 microns. In another preferred embodiment, the multi-layer film thickness is in the range of from about 47 microns to about 59 microns. In yet another embodiment, the multi-layer film thickness is selected from the group consisting of about 33 microns, about 34 microns, about 35 microns, about 36 microns, about 37 microns, about 38 microns, about 39 microns, about 40 microns, about 41 microns, about 42 microns, about 43 microns, about 44 microns, about 45 microns, about 46 microns, about 47 microns, about 48 microns, about 49 microns, about 50 microns, about 51 microns, about 52 microns, about 53 microns, about 54 microns, about 55 microns, about 56 microns, about 57 microns, about 58 microns, about 59 microns, about 60 microns, about 1 microns, about 62 microns, about 63 microns, about 64 microns, and about 66 microns. In a further preferred embodiment, said combined film thickness can be a number (integer or non-integer) between any two integer numbers between and including 33 microns and 66 microns identified supra. For example, the combined thickness can be 33.1 microns, 33.2 microns, 33.3 microns, 33.4 microns, 33.5 microns, 33.6 microns, 33.7 microns, 33.8 microns, 33.9 microns and so on and so forth.

In a preferred embodiment, the combined thickness of said first at least one interposed layer and said second at least one interposed layer is in the range of from about 10% to about 27% of the total thickness of said multi-layer film. In a preferred embodiment, the multi-layer film thickness is selected from the group consisting of about 10%, about 11%, about 12%, about 13%, about 14%, about 15%, about 16%, about 17%s, about 18%, about 19%, about 20%, about 21%s, about 22%, about 23%, about 24%, about 25%, about 26%, and about 27%. In a preferred embodiment, said combined film thickness can be a number (integer or non-integer) between any two integer numbers between and including 10% and 27% identified supra. For example, the combined thickness can be about 10.1%, about 10.2%, about 10.3%, about 10.4%, about 10.5%, about 10.6%, about 10.7%, about 10.8%, about 10.9%, and so on and so forth.

Similarly, in a preferred embodiment, the combined thickness of said inner and said outer sealant layers is in the range of from about 10% to about 27% of the total thickness of said multi-layer film. In a preferred embodiment, the multi-layer film thickness is selected from the group consisting of about 10%, about 11%, about 12%, about 13%, about 14%, about 15%, about 16%, about 17%s, about 18%, about 19%, about 20%, about 21%s, about 22%, about 23%, about 24%, about 25%, about 26%, and about 27%. In a preferred embodiment, said combined film thickness can be a number (integer or non-integer) between any two integer numbers between and including 10% and 27% identified supra. For example, the combined thickness can be about 10.1%, about 10.2%, about 10.3%, about 10.4%, about 10.5%, about 10.6%, about 10.7%, about 10.8%, about 10.9%, and so on and so forth.

The Inner and the Outer Sealant-Layer

In one embodiment, the multi-layer film comprises an at least one inner sealant layer, and an at least one outer sealant layer. The inner sealant layer is externally on one side of the multi-layer film, and the outer sealant layer is externally on the other side of the multi-layer film The multi-layer film comprises one inner sealant layer or more than one inner sealant-layers. For example, the multi-layer film can have two, three, or four inner sealant-layers stacked adjacent to each other. Similarly, the multi-layer film comprises one outer sealant layer or more than one outer sealant layers. For example, the multi-layer film can have two, three, or four outer sealant layers.

While it may be preferred that the inner sealant-layer and the outer sealant layer thicknesses are approximately the same, in other preferred embodiments, their thicknesses may not be the same.

Also, while it is preferred that the multi-layer film of the present invention comprises the same number of inner sealant-layers and the outer sealant layers, in other embodiments, the number of inner sealant layers may be different from the number of outer sealant layers.

For this invention, the total combined thickness of said at least one inner sealant layer and said at least one outer sealant layer is from about 10% to about 27% of the total thickness of the multi-layer film. In other embodiments of the invention, the total combined thickness of the sealant layers can be about 11%, about 12%, about 13%, about 14%, about 15%, about 16%, about 17%, about 18%, about 19%, about 20%, about 21%, about 22%, about 23%, about 24%, about 25%, and about 26%, of the total thickness of the multi-layer film. The total combined thickness of the sealant layers can also be intermediate percentage between the percentages cited supra—for example, a total combined thickness that is from about 11.1%, about 11.2%, about 11.3%, about 11.4%, and so on and so forth between other percentages cited.

The at least one inner sealant-layer and the at least one outer sealant-layer comprise polyethylene that is selected from the group consisting of:

(i) an at least one low-density ethylene-alpha-olefin copolymer, (ii) a blend of said at least one low-density ethylene-alpha-olefin copolymer and an at least one ethylene homopolymer, wherein said ethylene homopolymer is made in a high-pressure polymerization process; and (iii) a blend of said at least one low-density ethylene-alpha-olefin copolymer and an at least one ethylene copolymer, wherein said ethylene copolymer is made in a high-pressure polymerization process.

The ethylene homopolymer used in the at least one inner sealant layer or in the at least one outer sealant layer, in one embodiment, is made in a high-pressure polymerization process. One or more ethylene homopolymers can be used in the at least one inner sealant layer or in the at least one outer sealant layer. In one embodiment, the weight percent of the ethylene homopolymer is from 0 to about 15 parts by weight of said at least one inner sealant layer or said at least one outer sealant layer. In other embodiments, the weight percent range of the ethylene homopolymer can be defined by any two numbers from about 0.0, about 0.5, about 1.0, about 1.5, about 2.0, about 2.5, about 3.0, about 3.5, about 4.0, about 4.5, about 5.0, about 5.5, about 6.0, about 6.5, about 7.0, about 7.5, about 8.0, about 8.5, about 9.0, about 9.5, about 10.0, about 10.5, about 11.0, about 11.5, about 12.0, about 12.5, about 13.0, about 13.5, about 14.0, about 14.5, and about 15.0 parts by weight of said at least one inner sealant layer or said at least one outer sealant layer. The ethylene homopolymer has a density in the range of from about 0.918 to about 0.923 g/cm$^3$, and a melt-index in the range of from about 0.1 to about 1.1 dg/min. In other embodiments, the ethylene homopolymer density range can be defined by any two numbers, namely, about 0.918, about 0.919, about 0.920, about 0.921, about 0.922, and about 0.923 g/cm$^3$, Similarly, the melt-index range can also be defined by any two numbers, namely, about 0.1, about 0.2, about 0.3, about 0.4, about 0.5, about 0.6, about 0.7, about 0.8, about 0.9, about 1.0, and 1.1 dg/min.

In another embodiment, more than one ethylene homopolymers may be used in one or more layers of the inner sealant layer or the outer sealant layers. The number of ethylene homopolymers and the type of ethylene homopolymers may vary between any two inner sealant layers or the outer sealant layers. For example, a multi-layer film comprises three inner sealant-layers (I1, I2, and I3) and three outer sealant layers (O1, O2, and O3). In one embodiment, I2, and I3, and O1, O2, and O3, for example, may have only one and the same ethylene homopolymer. In another embodiment, I1, I2, and I3 may have the same ethylene homopolymer, but different from O1, O2, and O3. In another embodiment, for example, I1 may have two ethylene homopolymers while I2 may have three ethylene homopolymers, while I3 may have no ethylene homopolymer. Two ethylene homopolymers may differ from each other by having different densities, different melt-indices, different molecular weights, or different branch structures.

The ethylene copolymer used in the at least one inner sealant layer or in the at least one outer sealant layer, in one embodiment, is made in a high-pressure polymerization process. One or more ethylene copolymers can be used in the at least one inner sealant layer or in the at least one outer sealant layer. In one embodiment, the weight percent of the ethylene homopolymer is from 0 to about 15 parts by weight of said at least one inner sealant layer or said at least one outer sealant layer. In other embodiments, the weight percent range of the ethylene homopolymer can be defined by any two numbers from about 0.0, about 0.5, about 1.0, about 1.5, about 2.0, about 2.5, about 3.0, about 3.5, about 4.0, about 4.5, about 5.0, about 5.5, about 6.0, about 6.5, about 7.0, about 7.5, about 8.0, about 8.5, about 9.0, about 9.5, about 10.0, about 10.5, about 11.0, about 11.5, about 12.0, about 12.5, about 13.0, about 13.5, about 14.0, about 14.5, and about 15.0 parts by weight. The ethylene copolymer has a density in the range of from about 0.930 to about 0.960 g/cm$^3$, and a melt-index in the range of from about 0.1 to about 10 dg/min. The density range can also be defined by any two numbers from about 0.930, about 0.931, . . . , about 0.958, about 0.959, and about 0.960 g/cm$^3$.

In another embodiment, more than one ethylene copolymers may be used in one or more layers of the inner sealant layer or the outer sealant layers. The number of ethylene copolymers and the type of ethylene copolymers may vary between any two inner sealant layers or the outer sealant layers. For example, a multi-layer film comprises three inner sealant-layers (I1, I2, and I3) and three outer sealant layers (O1, O2, and O3). In one embodiment, I1, I2, and I3, and O1, O2, and O3, for example, may have only one and the same ethylene copolymer. In another embodiment, I1, I2, and I3 may have the same ethylene copolymer, but different from O1, O2, and O3. In another embodiment, for example, I1 may have two ethylene copolymers while I2 may have three ethylene copolymers, while I3 may have no ethylene copolymer. Two ethylene copolymers may differ from each other by having different densities, different melt-indices, different molecular weights, or different branch structures.

The comonomer of ethylene in the ethylene copolymer described in the foregoing can be chosen from polar monomers such as vinyl acetate, acrylic acid, methacrylic acid, and vinyl methacrylate, wherein the ethylene copolymer is manufactured in a high-pressure polymerization process. The concentration of polar comonomer must be kept relatively low in order that the copolymer has good compatibility with the major polyethylene component of the sealant layer(s). For example, ethylene vinyl acetate copolymers should contain less than or equal to 15 wt % vinyl acetate. Otherwise, poor optical appearance, and even poor intra-layer adhesion, can result.

In another embodiment, the at least one inner sealant layer or the at least one outer sealant layer comprises at least one low-density ethylene-alpha-olefin copolymer, which may be found alone or in a blend form with an ethylene homopolymer described supra, or ethylene copolymer described supra. Such low-density ethylene alpha-olefin copolymer, in a preferred embodiment, is found as a copolymer that is from about 80 to about 98 parts by weight of the at least one inner or the at least one outer sealant layer weight. The copolymer range can also be defined by any two numbers from about 80, about 81, about 82, . . . about 96, about 97, and about 98 parts by weight of the at least one inner or the at least one outer sealant layer weight. The copolymer is a low-density copolymer of ethylene and an at least one $C_4$-$C_{10}$ alpha-olefin manufactured in a polymerization process using a single-site polymerization catalyst, with a density in the range of from about 0.909 to about 0.935 g/cm$^3$ and a melt-index in the range of from about 0.5 to about 1.5 dg/min. The density range can also be defined by any two numbers from about 0.909, about 0.910, about 0.911, . . . , about 0.933, about 0.934, and about 0.935 g/cm$^3$. Similarly, the melt-index range can be defined by any two numbers from about 0.5, about 0.6, about 0.7, about, . . . , about 1.3, about 1.4, and about 1.5 dg/min. In addition, said embodiment further comprises, from about 0 to about 15 parts by weight of an additional at least one low-density copolymer of ethylene and an at least one $C_4$-$C_{10}$ alpha-olefin. In other embodiments, the weight percent range of the additional at least one low-density copolymer of ethylene and an at least one $C_4$-$C_{10}$ alpha-olefin can be defined by any two numbers from about 0.0, about 0.5, about 1.0, about 1.5, about 2.0, about 2.5, about 3.0, about 3.5, about 4.0, about 4.5, about 5.0, about 5.5, about 6.0, about 6.5, about 7.0, about 7.5, about 8.0, about 8.5, about 9.0, about 9.5, about 10.0, about 10.5, about 11.0, about 11.5, about 12.0, about 12.5, about 13.0, about 13.5, about 14.0, about 14.5, and about 15.0 parts by weight. Said additional at least one low-density copolymer is an ultra-low density copolymer of ethylene and said at least one $C_4$-$C_{10}$ alpha-olefin, manufactured in a polymerization process using a single-site polymerization catalyst, with a density in the range of from about 0.859 to about 0.888 g/cm$^3$ and a melt-index in the range of from about 0.4 to about 0.6 dg/min. The density range can also be defined by any two numbers from about 0.859, about 0.860, about 0.861, . . . , about 0.886, about 0.887, and about 0.888 g/cm$^3$. Similarly, the melt-index range can be defined by any two numbers from about 0.4, about 0.45, about 0.5, about 0.55, and about 0.6 dg/min.

In another embodiment, the foregoing low-density copolymer of ethylene and at least one $C_4$-$C_{10}$ alpha-olefin, or said at least one ultra-low density copolymer of ethylene and at least one $C_4$-$C_{10}$ alpha-olefin is selected from ethylene/butene-1 copolymers, ethylene/hexene-1 copolymers, ethylene/octene-1 copolymers, ethylene/octene-1/butene-1 terpolymers and ethylene/hexene-1/butene-1 terpolymers.

The $C_4$-$C_{10}$ alpha-olefin also includes the cyclic counterparts.

In a preferred embodiment, the thickness of said at least one sealant layer is from about 2 microns about 20 microns. The thickness of said at least one sealant layer can be about 3, about 4, about 5, about 6, 7 about, 8, about 9, 10 about, 11, about 12, 13 about, 14, about 15, about 16, 17, about 18, about 19, or about 20 microns.

The First and the Second Interposed Layer

In one embodiment, the multi-layer film comprises a first at least one interposed layer adjacent to an at least one inner sealant layer and to an at least one core layer on the other side, and a second at least one interposed layer adjacent to said core layer on the other side of the said first at least one interposed layer and adjacent to an at least one outer sealant layer. The inner sealant layer is externally on one side of the multi-layer film, and the outer sealant layer is externally on the other side of the multi-layer film.

The multi-layer film comprises one first interposed layer or more than one first interposed layers. For example, the multi-layer film can have two, three, or four first interposed layers stacked adjacent to each other. Similarly, the multi-layer film comprises one second interposed layer or more than one second interposed layers. For example, the multi-layer film can have two, three, or four second interposed layers.

While it may be preferred that the first interposed layer and the second interposed layer thicknesses are approximately the same, in other preferred embodiments, their thicknesses may not be the same.

Also, while it is preferred that the multi-layer film of the present invention comprises the same number of first interposed layers and the second interposed layers, in other embodiments, the number of first interposed layers may be different from the number of second interposed layers.

In this invention, the centerline of said first at least one interposed layer is closer to the centerline of said at least one inner sealant-layer than to the centerline of said multi-layer film. If more than one first interposed layers are present, then reference is made to the centerline of the combined set of first interposed layers. Similarly, if there is more than one inner sealant layer, then reference is made to the centerline of the combined set of inner sealant layers.

For this invention, the total combined thickness of said first at least one interposed layer and said second at least one interposed layer is from about to % to about 27% of the total thickness of the multi-layer film. In other embodiments of the invention, the total combined thickness of the sealant layers can be about 11%, about 12%, about 13%, about 14%, about 15%, about 16%, about 17%, about 18%, about 19%, about 20%, about 21%, about 22%, about 23%, about 24%, about 25%, and about 26%, of the total thickness of the multi-layer film. The total combined thickness of the interposed layers can also be intermediate percentage between the percentages cited supra—for example, a total combined thickness that is from about 11.1%, 11.2%, 11.3%, 11.4%, and so on and so forth between other percentages cited.

The first at least one interposed layer and the second at least one interposed layer comprise:

(i) an at least one polypropylene blend comprising a major component polypropylene and a minor component polypropylene, wherein said major component polypropylene in the range of from about 50% to 90% of weight of said first at least one interposed layer, and said minor component polypropylene is in the range of from about 10% to about 49% of weight of said first at least one interposed layer;

(ii) optionally, an at least one ethylene-alpha-olefin copolymer; and (iii) optionally, a second ethylene-alpha-olefin copolymer that is not the same as said at least one ethylene-alpha-olefin copolymer in (ii).

The at least one polypropylene blend is a two component system. The at least one polypropylene blend is in the range of from about 70 to about 100 parts by weight of said first at least one interposed layer or of said second at least one interposed layer. The range can also be defined by any two numbers from about 70, about 71, about 72, . . . , about 98, about 99, and about 100 parts. The second component of the polypropylene blend, the minor component, acts as a compatibilizer between the first component and other resins within a layer of the multi-layer film. In addition, the presence of the second component in the polypropylene blend makes possible functional bonds between the polyethylene-based sealant and the polypropylene-based interposed layers, as well as the polyethylene-based core layer(s) and the polypropylene-based interposed layers. As a result, it is not necessary to use a functional polymeric compatibilizer within an interposed layer that includes polypropylene (first component, described infra). The two components are described below:

Major Component Polypropylene

The first component polypropylene, which is the major component, may be a heterogeneous or homogeneous copolymer of polypropylene, or a blend of copolymer polypropylenes with homopolymer polypropylenes. In one embodiment, to prepare a high impact strength version of the film, the grade of polypropylene or blend of polypropylene(s) used is such that the izod impact strength of the PP is greater than 9 ft-$lb_f$ per inch of notch according to American Society for Testing and Materials (ASTM) standard D256. More preferably, a particularly suitable polypropylene may be a blown-film grade, high impact copolymer with an izod impact strength (ASTM D257, at 23° C.) of from 8 to 80 ft-$lb_f$ per inch of notch, and melt flow index (ASTM D1238, 2.16 kg, 23° C.) of from about 0.3 to about 5.5 dg/min. The izod impact strength range can also be defined by any two numbers from 8, 9, 10, . . . , 78, 79, and 80 ft-$lb_f$ per inch of notch. Similarly, the melt-flow index range can also be defined by any two numbers from about 0.3, about 0.35, about 0.4, about 0.45, . . . , about 5.40, about 5.45, and about 5.50 dg/min. In a preferred embodiment, said at least one polypropylene has a melt-index in the range of from about 0.45 to about 0.75 dg/min.

Minor Component Polypropylene

The second component, which is the minor component of the polypropylene blend is in the weight range of from about 10-49% of the total weight of the interposed layer. Stated another way, the second component can be about 10%, about 11%, 12%, about 13%, 14%, about 15%, 16%, about 17%, 18%, about 19%, 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49% of the weight of the interposed layer. The second component can clearly also be about 10.1%, about 10.2%, about 10.3%, . . . , to about 48.1%, about 48.2%, about 48%, and so on and so forth. For sake of brevity, Applicants do not disclose each point within the range of an interval, but clearly contemplate as within the ambit of the present disclosure, the second component concentration to include also the tenth decimals of a given integer between the range of from about 10% to about 49%, for example, about 10.1, about 10.2, about 10.3, about 10.4%, and so on, and so forth.

The second component polypropylene comprises a special heterogeneous polypropylene interpolymer.

Figure 3:
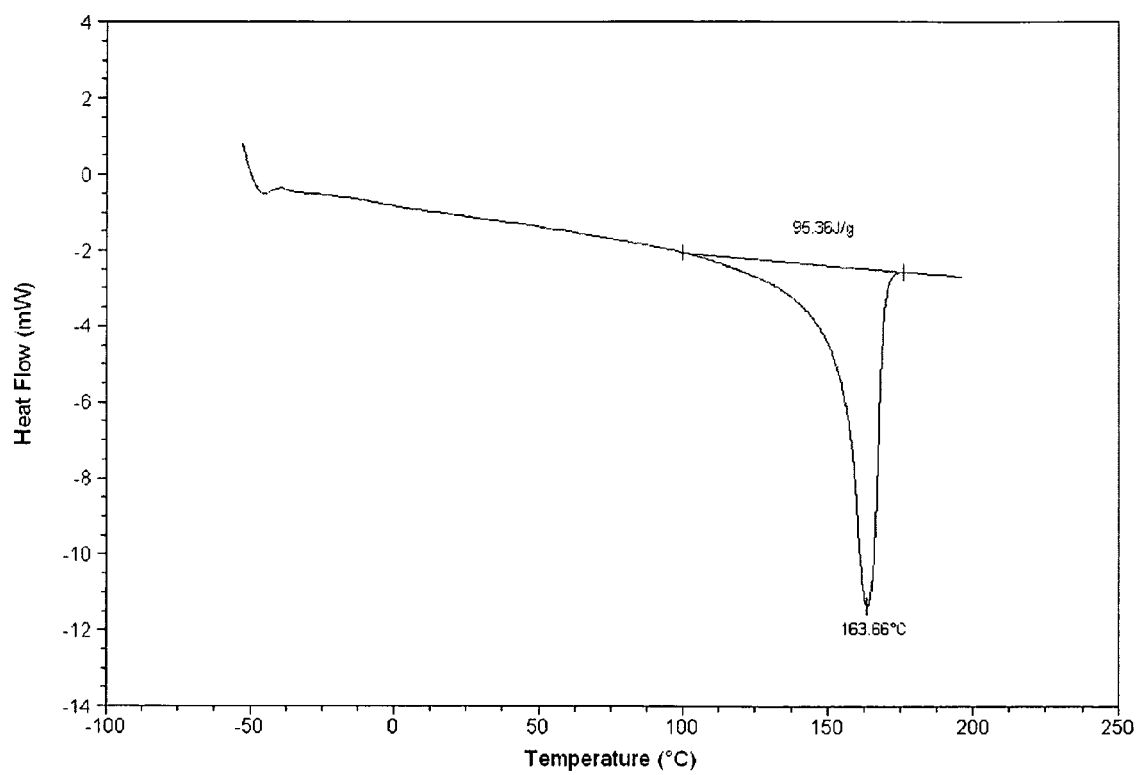
FIG. 3 shows DSC melting peak in the region 160-165° C. for isotactic polypropylene homopolymer ("homoPP").

Isotactic polypropylene homopolymer ("homoPP") is a homogeneous polymer normally polymerized in a single stage reaction. It has a single clean DSC melting peak in the region 160-165° C. as illustrated in FIG. 3 of the accompanying drawings.

Figure 4:
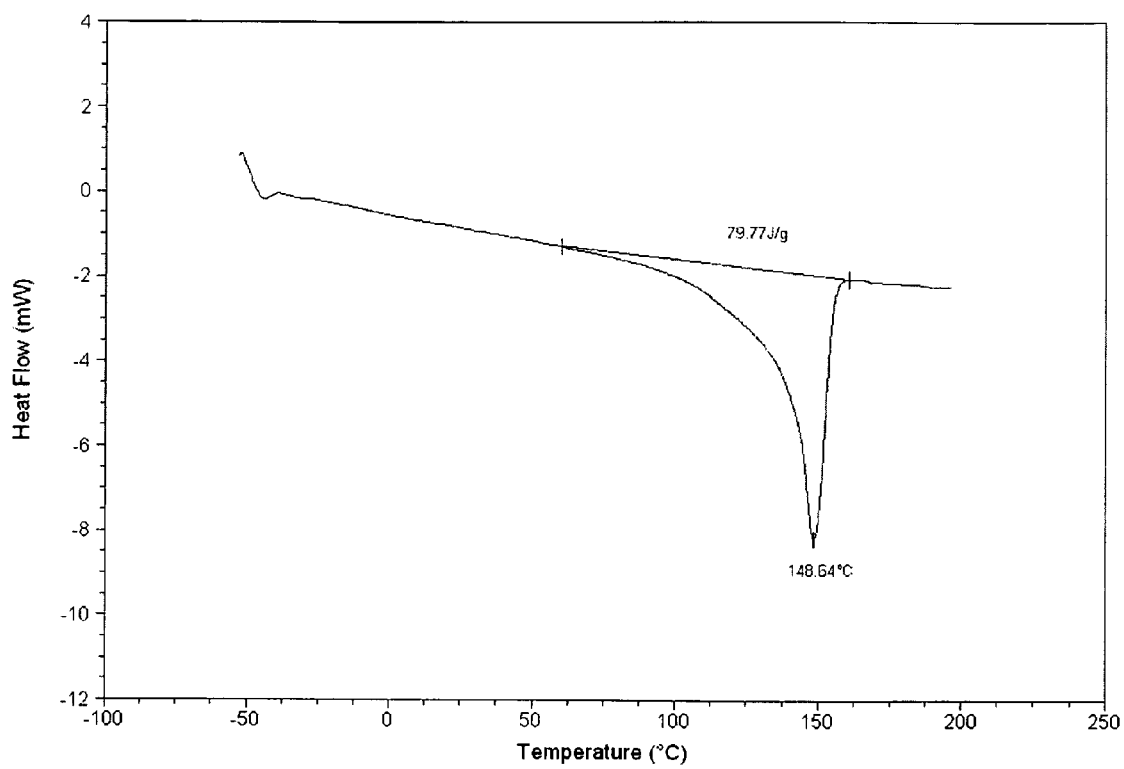
FIG. 4 shows DSC melting curve for a homogeneous propylene-ethylene interpolymer ("HOPI").

Homogeneous polypropylene interpolymers ("HOPI") also consist of a single phase, and have a single clean DSC melting peak, which occurs at a lower temperature than that of the homopolymer. The energy of melting of the homogeneous interpolymer is also somewhat lower than that of the homopolymer. A typical DSC melting curve for a homogeneous propylene-ethylene interpolymer is illustrated in FIG. 4 of the accompanying drawings.

The heterogeneous polypropylene interpolymers ("HEPI") are formed in a two-stage reaction. In the first stage, a crystalline network of isotactic polypropylene homopolymer or homogeneous polypropylene interpolymer is formed. In the second stage, a largely amorphous rubbery phase is formed within the crystalline network. A portion of the polymer formed in the second stage reaction is normally rich enough in comonomer to be able to crystallize to form a third phase. When the comonomer is ethylene, the third phase normally has a DSC melting peak in the 120-125° C. region as illustrated in FIG. 5 of the accompanying drawings.

The second component polypropylene of the invention ("HEPI*") is chosen from a subset of the heterogeneous polypropylene interpolymers ("HEPI"). This subset is characterized by the second stage of the polymerization process, used to produce the heterogeneous polypropylene interpolymer, being extremely efficient in producing amorphous rubbery polymer to the extent that almost no crystalline third phase is produced.

Figure 5:
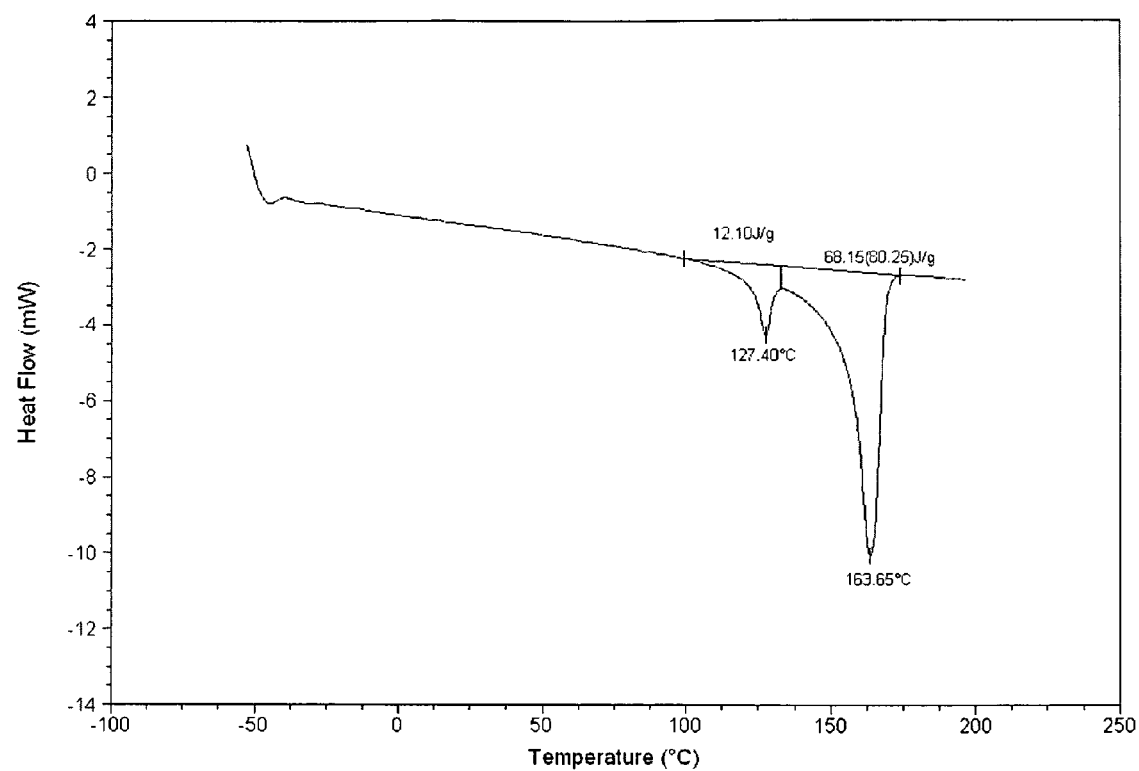
FIG. 5 shows the third-phase DSC melting peak in the 120-125° C. region of a heterogeneous polypropylene interpolymer, wherein the comonomer is ethylene ("HEPI").
Figure 8:
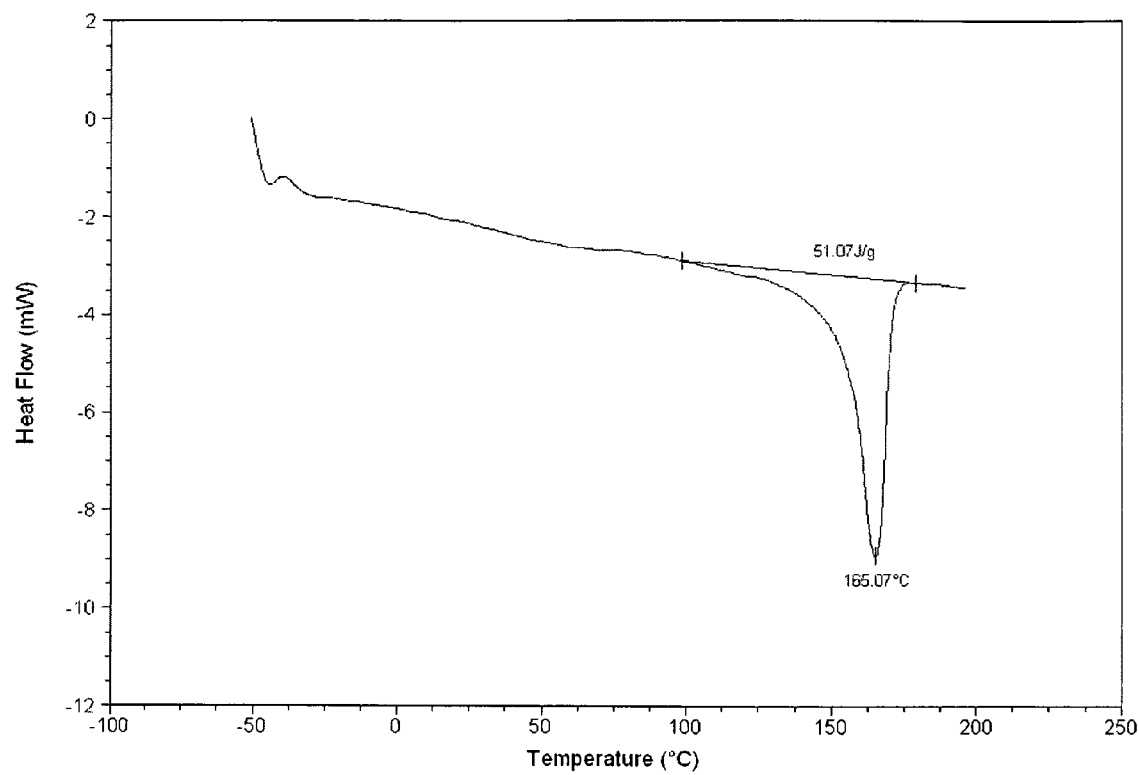
FIG. 8 shows the DSC melting curve for one of the special heterogeneous polypropylene interpolymers ("HEPI*") used as minor, or second, components in the unique polypropylene blend of the invention. The DSC curve is very different from FIG. 5.

As a result, the DSC melting curves for these special heterogeneous polypropylene interpolymers (FIG. 8) are quite different from those for typical heterogeneous polypropylene interpolymers (FIG. 5). The low-temperature peak is almost completely absent, making the curve look more like that for a homopolymer or homogeneous interpolymer (FIG. 3 or 4). However, the energy of melting for the heterogeneous polypropylene interpolymer used in the present blend is lower than that of either the homopolymer or the homogeneous copolymer. A slight shoulder may be observable in the temperature region 120-125° C.

The propylene concentration in any polypropylene interpolymer can be measured using the NMR spectroscopy method. The amorphous fraction of a polypropylene interpolymer can be estimated by measuring the xylene soluble fraction of that polymer using the xylene extraction method. Methods are subsequently described for NMR spectroscopy and for measuring the xylene soluble fraction.

Figure 6:
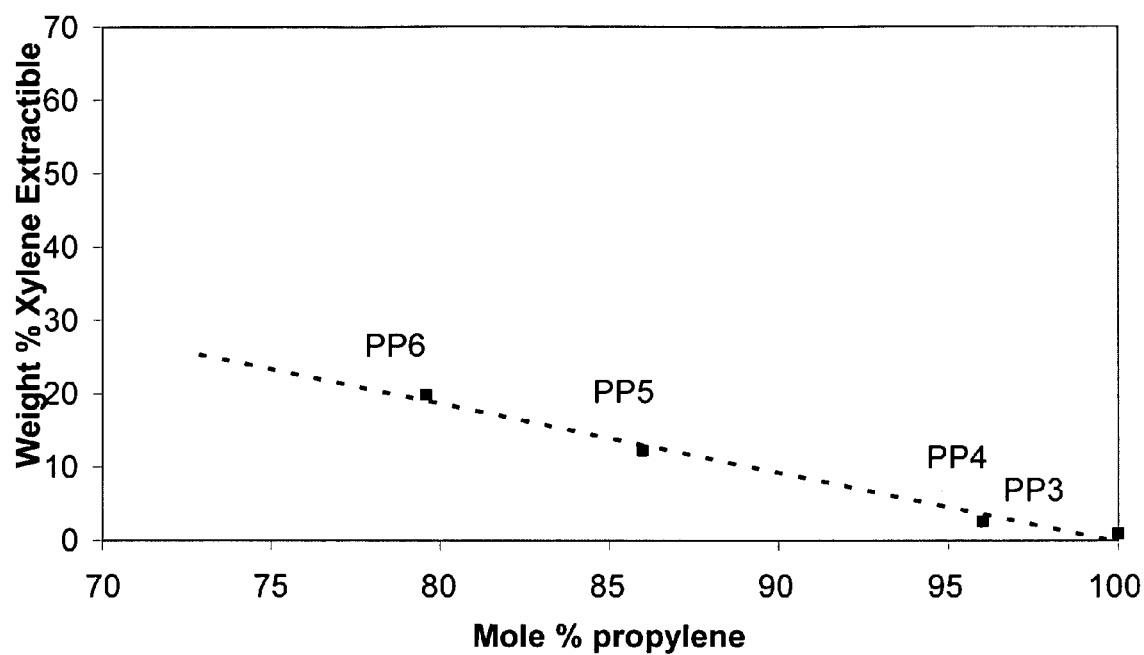
FIG. 6 shows a linear relationship between the amorphous content of a typical polypropylene interpolymer, either homogeneous or heterogeneous, and its polypropylene concentration.
Figure 7:
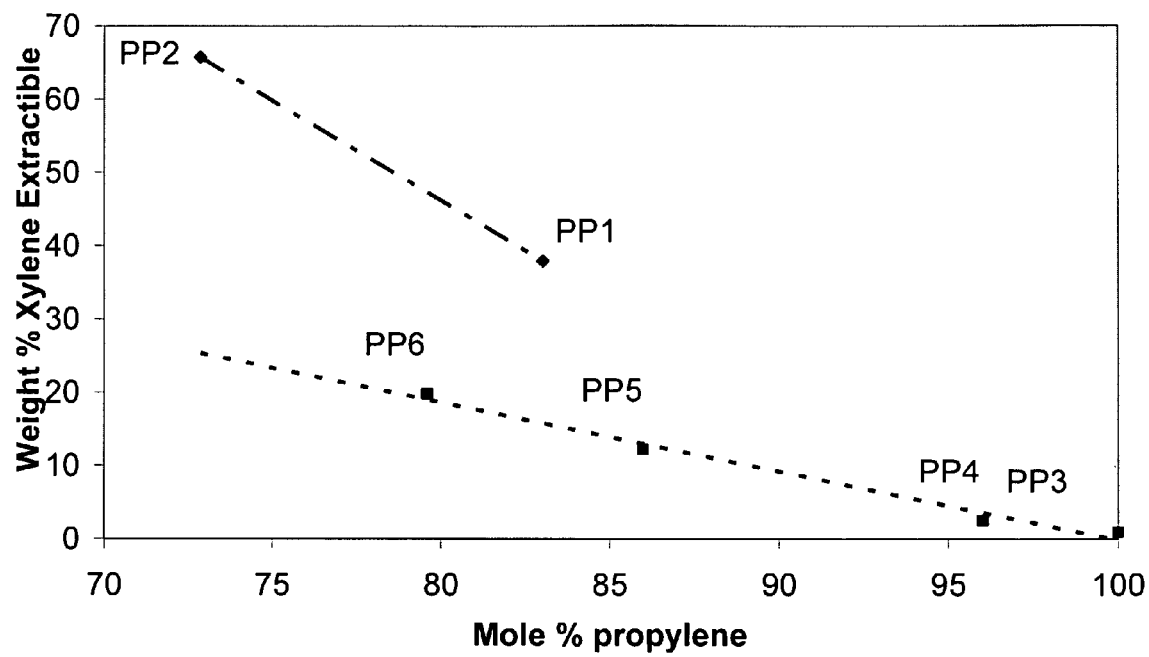
FIG. 7 shows that the unique heterogeneous polypropylene interpolymers used in this invention contain a much higher amorphous fraction, at a given propylene concentration, than do polypropylene interpolymers in general.

As can be seen in FIG. 6, there is a predictable linear relationship between the amorphous content of a typical polypropylene interpolymer, either homogeneous or heterogeneous, and its polypropylene concentration. Table A and FIG. 7 both show that the special heterogeneous polypropylene interpolymers HEPI* used in this invention (for example, PP1 and PP2) contain a much higher amorphous fraction, at a given propylene concentration, than do polypropylene interpolymers in general.

Molecular weight can be used to further distinguish the special polypropylene interpolymers HEPI* used in this invention. The overall molecular weight distribution of a polypropylene interpolymer, as well as the molecular weight distributions within the amorphous and crystalline fractions, can be determined using the method subsequently described. The comparative data included in this patent is for Weight Average Molecular Weight $M_W$. It is generally understood that polypropylene interpolymers with a higher overall $M_W$ will be tougher than polypropylene interpolymers with a lower overall $M_W$. However, it is also important for the unique polypropylene interpolymers used in this invention to have a relatively high $M_W$ in the amorphous fraction.

In a preferred embodiment, the second component polypropylene in the polypropylene blend in the interposed layer comprises at least one heterogeneous interpolymer of propylene with ethylene, or with ethylene and butene, comprising from about 71 mol % to about 86 mol % propylene and from about 29 mol % to about 14 mol % ethylene or ethylene and butene, the interpolymer having an overall weight average molecular weight ($M_w$) of at least about 400,000, a xylene soluble phase of not less than 27 wt %, with the xylene soluble phase having a Mw of at least about 275,000 and said heterogeneous interpolymer of polypropylene has a density of from 0.875 to 0.91 g/cm$^3$. In alternative embodiments, the propylene range can be defined by any two numbers from about 71, about 72, about 73, . . . , about 84, about 85, and about 86 mol % propylene, and correspondingly, the ethylene, or ethylene and butene range. In other embodiments, the density of said heterogeneous interpolymer of polypropylene can be defined by any two numbers in the range from about 0.875, about 0.876, about 0.877, . . . , about 0.908, about 0.909, and about 0.910 g/cm$^3$.

Suppliers of heterogeneous polypropylene interpolymers useful as second component polypropylenes in the present blends include Basal, Borealis, Total Petrochemicals (formerly Atofina Petrochemicals), Dow Chemical and ExxonMobil Chemical.

In the following Table A, relevant properties of various polypropylene polymers are described.

TABLE A

PPI Polymers - Relevant Properties

| Supplier | ID | Description | Melt-index (dg/min) | Density (g/cm$^3$) |
|---|---|---|---|---|
| Basell | PP1 | HEPI* | 0.65 | 0.890 |
| Basell | PP2 | HEPI* | 0.60 | 0.890 |
| Huntsman | PP3 | homoPP | 0.5 | 0.900 |
| Huntsman | PP4 | HOPI | 2.0 | 0.900 |
| Basell | PP5 | HEPI | 0.45 | 0.900 |
| Flint Hills | PP6 | HEPI | 0.7 | 0.900 |

In another embodiment, the first or the second at least one interposed layers comprises a first at least one ethylene-alpha olefin copolymer. The ethylene-alpha olefin copolymer is in the range of from about 0 to about 15 parts by weight of said first at least one interposed layer or of said second at least one interposed layer. In other embodiments, the weight percent range of the ethylene-alpha olefin copolymer can be defined by any two numbers from about 0.0, about 0.5, about 1.0, about 1.5, about 2.0, about 2.5, about 3.0, about 3.5, about 4.0, about 4.5, about 5.0, about 5.5, about 6.0, about 6.5, about 7.0, about 7.5, about 8.0, about 8.5, about 9.0, about 9.5, about 10.0, about 10.5, about 11.0, about 11.5, about 12.0, about 12.5, about 13.0, about 13.5, about 14.0, about 14.5, and about 15.0 parts by weight. The copolymer is an ultra-low-density copolymer of ethylene and an at least one $C_4$-$C_{10}$ alpha-olefin manufactured in a polymerization process using a single-site polymerization catalyst, with a density in the range of from about 0.859 to about 0.905 g/cm$^3$ and a melt-index in the range of from about 0.4 to about 1.1 dg/min. The density range can also be defined by any two numbers from about 0.859, about 0.860, about 0.861, . . . , about 0.903, about 0.904, and about 0.905 g/cm$^3$. Similarly, the melt-index range can be defined by any two numbers from about 0.4, about 0.45, about 0.5, . . . , about 0.95, about 1.0, and about 1.1 dg/min.

In another embodiment, the second ethylene-alpha-olefin copolymer is in the range of from about 0 parts to 15 parts by weight, and can be manufactured in a polymerization process using either a single-site or Zeigler-Natta polymerization catalyst, wherein said copolymer has a density in the range of from about 0.909 to about 0.935 g/cm$^3$ and a melt-index in the range of from about 0.5 to about 1.5 dg/min. In other embodiments, the weight percent range of the second ethylene-alpha-olefin copolymer can be defined by any two numbers from about 0.0, about 0.5, about 1.0, about 1.5, about 2.0, about 2.5, about 3.0, about 3.5, about 4.0, about 4.5, about 5.0, about 5.5, about 6.0, about 6.5, about 7.0, about 7.5, about 8.0, about 8.5, about 9.0, about 9.5, about 10.0, about 10.5, about 11.0, about 11.5, about 12.0, about 12.5, about 13.0, about 13.5, about 14.0, about 14.5 and about 15.0 parts by weight. The density range can also be defined by any two numbers from about 0.909, about 0.910, about 0.911, . . . , about 0.933, about 0.934, and about 0.935 g/cm$^3$. Similarly, the melt-index range can be defined by any two numbers from about 0.5, about 0.55, about 0.60, . . . , about 1.40, about 1.45, and about 1.50 dg/min. The second ethylene-alpha-olefin copolymer is not the same as the first at least one ethylene-alpha olefin copolymer described supra.

In another embodiment, the foregoing low-density copolymer of ethylene and at least one $C_4$-$C_{10}$ alpha-olefin, or said at least one ultra-low density copolymer of ethylene and at least one $C_4$-$C_{10}$ alpha-olefin is selected from ethylene/butene-1 copolymers, ethylene/hexene-1 copolymers, ethylene/octene-1 copolymers, ethylene/octene-1/butene-1 terpolymers and ethylene/hexene-1/butene-1 terpolymers.

The $C_4$-$C_{10}$ alpha-olefin also includes the cyclic counterparts.

Figure 2:
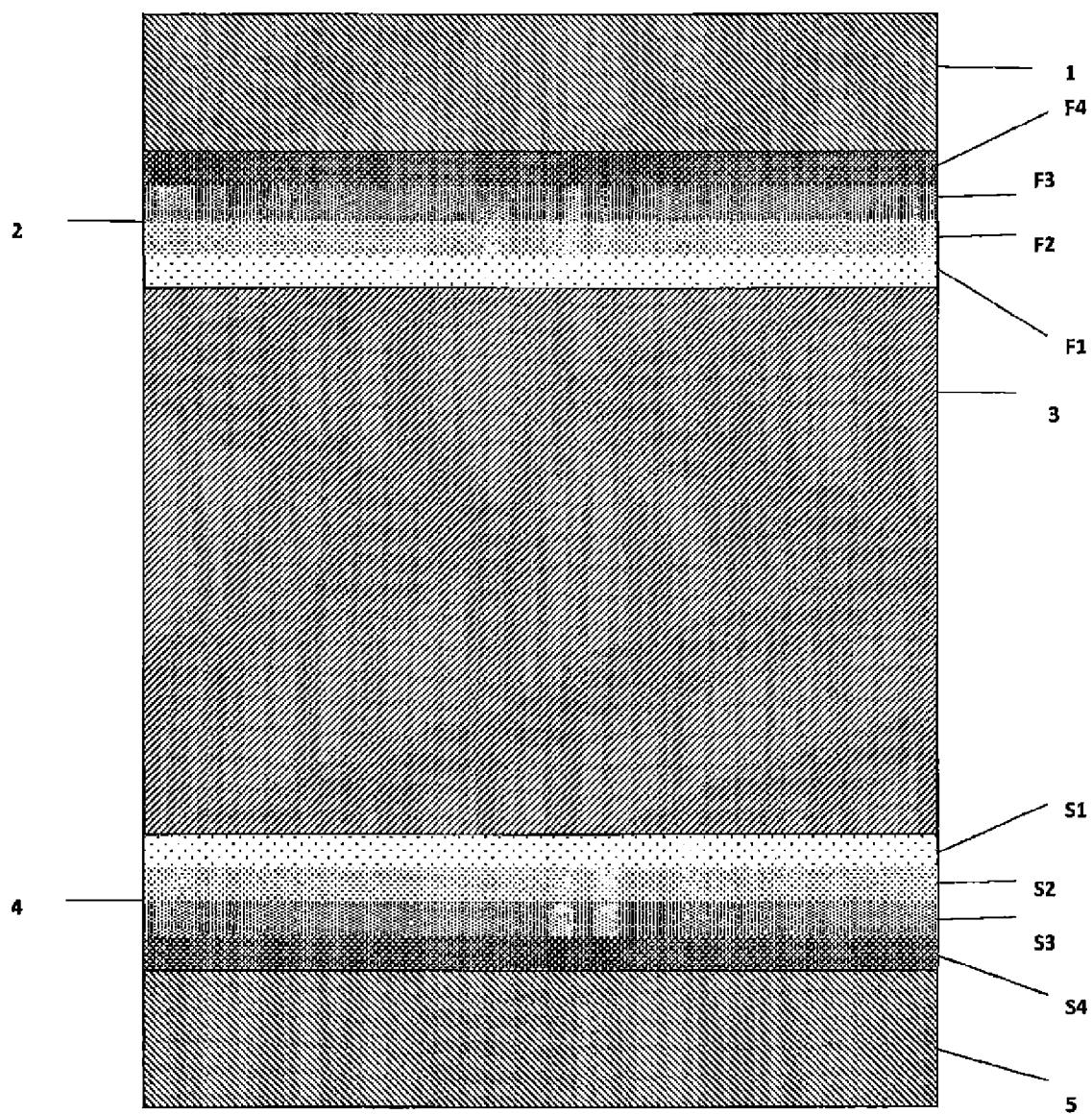
FIG. 2 shows the schematic of interposed layer having multiple layers with varying concentrations of the polypropylene blend polymer.

The first interposed layer and/or the second interposed layer may comprise more than one interposed layer. In one embodiment, the PP blend distribution will be different between the different interposed layers of the first and/or the second interposed layer in such a way that the first component polypropylene concentration by its percent weight of the total weight of the specific interposed layer, increases as from the innermost interposed layer (that layer which is more proximate to the core layer) to the outermost interposed layer (that layer which is more proximate to the sealant layers. This embodiment is schematically described in FIG. 2. In FIG. 2, a multi-layer film is shown. The first and the second interposed layers, each, comprise four layers (F1, F2, F3, F4 and S1, S2, S3, S4, respectively). F1 and S1 are layers most proximate to the core layer C. Similarly, F4 and S4 are proximate to the inner sealant-layer (I) and the outer sealant layer (O). Fr, for example, has 50% of first component polypropylene, F2 has 70% of first component polypropylene, F3 has 80% first component polypropylene and F4 has 90% first component polypropylene, with the added restriction that the overall concentration of first component polypropylene in the first and in the second interposed layers must be about 50 to about 90 wt %. In other embodiments, the range of first component polypropylene can be defined by any two numbers from about 50, about 51, about 52, . . . , about 88, about 89, and about 90 wt %. Similarly, the second interposed layers S1-S4 can also have varying amounts of PP, increasing in concentration from S1 to S4.

In one embodiment, the thickness of the first interposed layers, for example, F1, F2, F3, and F4 is different. Similarly, the thickness of the second interposed layers, S1, S2, S3, and S4 can also be different.

In another preferred embodiment, the invention relates to the introduction of a clarifier either by the use of one or more pre-clarified polypropylene resin grades as the first component polypropylene, or by separate addition, to create a clear film even when high levels of first component polypropylene are present in the blend. A clearer film is desirable for the packaging of milk, liquids, and/or other flowables. The clearer film offers the consumer and packager an opportunity to assess product quality by eye. The clarifier improves the aesthetic appeal of the film without compromising the physical properties of the film. The mechanism of clarification requires that the PP phase is nucleated to such an extent that many small PP spherulites are produced upon cooling as opposed to fewer spherulites than can grow to create larger particles in PP blends or PP-PE blends.

A person skilled in the art will know which polypropylene clarifiers and/or nucleating agents are suitable for use. Preferably, such clarifier may be selected from the group consisting of 4-biphenyl carboxylic acid, thymine, talc, sodium benzoate or dibenzylidene sorbitol (DBS), bis (p-methyl-dibenzylidene sorbitol) (MDBS) and related sorbitol derivatives. The amount of clarifier that may be preferably typically used is in the range of 0.05 to 0.5% by weight of the first or second at least one interposed layer. In other embodiments, the clarifier amount range can be defined by any two numbers from about 0.05, about 0.1, about 0.15, . . . , 0.40, 0.45, and 0.50% by weight.

In a preferred embodiment, the thickness of said at least one interposed layer is from about 2 microns about 20 microns. The thickness of said at least one interposed layer can be about 3, about 4, about 5, about 6, about 7, about 8, about 9, about 10, about 11, about 12, about 13, about 14, about 15, about 16, about 17, about 18, about 19, or about 20 microns.

Core Layer

The multi-layer film comprises at least one core layer that is adjacent to the first at least one interposed layer on one side and the second at least one interposed layer on the opposite side. The core layer comprising polyethylene that is selected from the group consisting of:
(i) at least one low-density ethylene-alpha olefin copolymer,
(ii) a blend of said at least one low-density ethylene-alpha-olefin copolymer and an at least one ethylene homopolymer, wherein said ethylene homopolymer is made in a high-pressure polymerization process; and
(iii) a blend of said at least one low-density ethylene-alpha-olefin copolymer and an at least one ethylene copolymer, wherein said ethylene copolymer is made in a high-pressure polymerization process.

The ethylene homopolymer used in the at least one core layer, in one embodiment, is made in a high-pressure polymerization process. One or more ethylene homopolymers can be used in the core layer. In one embodiment, the weight percent of the ethylene homopolymer is from 10 to about 50 parts by weight of said at least one core layer. In other embodiments the weight percent of the ethylene homopolymer range is defined by any two numbers from about 10, about 11, about 12, . . . , about 48, about 49, and about 50 parts by weight of said at least one core layer. The ethylene homopolymer has a density in the range of from about 0.918 to about 0.923 g/cm$^3$, and a melt-index in the range of from about 0.1 to about 1.1 dg/min. The density range can also be defined by any two numbers from about 0.918, about 0.919, about 0.920, about 0.921, about 0.922, and about 0.923 g/cm$^3$. Similarly, the melt-index range can also be defined by any two numbers, namely, about 0.1, about 0.2, about 0.3, about 0.4, about 0.5, about 0.6, about 0.7, about 0.8, about 0.9, about 1.0, and 1.1 dg/min.

In another embodiment, more than one ethylene homopolymers may be used in one or more layers of the core layer. The number of ethylene homopolymers and the type of ethylene homopolymers may vary between any core layers. For example, a multi-layer film comprises three core layers (C1, C2, and C3). In one embodiment, C1, C2, and C3, for example, may have only one and the same ethylene homopolymer. In another embodiment, C1, C2, and C3 may have the same ethylene homopolymer. In another embodiment, for example, C1 may have two ethylene homopolymers while C2 may have three ethylene homopolymers, while C3 may have no ethylene homopolymer. Two ethylene homopolymers may differ from each other by having different densities, different melt-indices, different molecular weights, or different branch structures.

The ethylene copolymer used in the at least one core layer, in one embodiment, is made in a high-pressure polymerization process. One or more ethylene copolymers can be used in the at least one core layer. In one embodiment, the weight percent of the ethylene homopolymer is from 10 to about 50 parts by weight of said at least one inner sealant layer or said at least one outer sealant layer. The ethylene copolymer has a density in the range of from about 0.930 to about 0.960 g/cm$^3$, and a melt-index in the range of from about 0.1 to about 10 dg/min. The density range can also be defined by any two numbers from about 0.930, about 0.935, about 0.940, about 0.945, about 0.950, about 0.955, and about 0.960 g/cm$^3$. Similarly, the melt-index range can also be defined by any two numbers, namely, about 0.1, about 0.2, about 0.3, . . . , about 9.8, about 9.9, and about 10.0 dg/min.

In another embodiment, more than one ethylene copolymers may be used in one or more layers of the core layers. The number of ethylene copolymers and the type of ethylene copolymers may vary between any two core layers. For example, a multi-layer film comprises three core layers (C1, C2, and C3). In one embodiment, C1, C2, and C3, for example, may have only one and the same ethylene copolymer. In another embodiment, for example, C1 may have two ethylene copolymers while C2 may have three ethylene copolymers, while C3 may have no ethylene copolymer. Two ethylene copolymers may differ from each other by having different densities, different melt-indices, different molecular weights, or different branch structures.

The comonomer of ethylene in the ethylene copolymer described in the foregoing can be chosen from polar monomers such as vinyl acetate, acrylic acid, methacrylic acid, and vinyl methacrylate, wherein the ethylene copolymer is manufactured in a high-pressure polymerization process. The concentration of polar comonomer must be kept relatively low in order that the copolymer has good compatibility with the major polyethylene component of the sealant layer(s). For example, ethylene vinyl acetate copolymers should contain less than or equal to 15 wt % vinyl acetate. Otherwise, poor optical appearance, and even poor intra-layer adhesion, can result.

In another embodiment, the at least one core layer comprises at least one low-density ethylene-alpha-olefin copolymer, which may be found alone or in a blend form with an ethylene homopolymer described supra, or ethylene copolymer described supra. Such low-density ethylene alpha-olefin copolymer, in a preferred embodiment, is found as a copolymer that is from about 35 to about 85 parts by weight of the at least one core layer weight. The copolymer range can also be defined by any two numbers from about 35, about 36, about 37, . . . , about 83, about 84, and about 85 parts by weight of the at least one core layer weight The copolymer is a low-density copolymer of ethylene and an at least one $C_4$-$C_{10}$ alpha-olefin manufactured in a polymerization process using a single-site polymerization catalyst, with a density in the range of from about 0.909 to about 0.935 g/cm$^3$ and a melt-index in the range of from about 0.5 to about 1.5 dg/min. The density range can also be defined by any two numbers from about 0.909, about 0.910, about 0.911, . . . , about 0.933, about 0.934, and about 0.935 g/cm$^3$. Similarly, the melt-index range can be defined by any two numbers from about 0.5, about 0.6, about 0.7, . . . , about 1.3, about 1.4, and about 1.5 dg/min. In addition, said embodiment further comprises, from about 0 to about 15 parts by weight of an additional at least one low-density copolymer of ethylene and an at least one $C_4$-$C_{10}$ alpha-olefin. In other embodiments, the weight percent range can be defined by any two numbers from about 0.0, about 0.5, about 1.0, about 1.5, about 2.0, about 2.5, about 3.0, about 3.5, about 4.0, about 4.5, about 5.0, about 5.5, about 6.0, about 6.5, about 7.0, about 7.5, about 8.0, about 8.5, about 9.0, about 9.5, about 10.0, about 10.5, about 11.0, about 11.5, about 12.0, about 12.5, about 13.0, about 13.5, about 14.0, about 14.5, and about 15.0 parts. Said additional at least one low-density copolymer is an ultra-low density copolymer of ethylene and said at least one $C_4$-$C_{10}$ alpha-olefin, manufactured in a polymerization process using a single-site polymerization catalyst, with a density in the range of from about 0.859 to about 0.905 g/cm$^3$ and a melt-index in the range of from about 0.4 to about 11 dg/min. Similarly, the density range can also be defined by any two numbers from about 0.859, about 0.860, about 0.861, . . . , about 0.903, about 0.904, and about 0.905 g/cm$^3$. Similarly, the melt-index range can be defined by any two numbers from about 0.4, about 0.45, about 0.50, . . . , about 1.0, about 1.05, and about 1.10 dg/min.

In another embodiment, the foregoing low-density copolymer of ethylene and at least one $C_4$-$C_{10}$ alpha-olefin, or said at least one ultra-low density copolymer of ethylene and at least one $C_4$-$C_{10}$ alpha-olefin is selected from ethylene/butene-1 copolymers, ethylene/hexene-1 copolymers, ethylene/octene-1 copolymers, ethylene/octene-1/butene-1 terpolymers and ethylene/hexene-1/butene-1 terpolymers.

The $C_4$-$C_{10}$ alpha-olefin also includes the cyclic counterparts.

Therefore generally, the present invention also provides a multilayer film formed from a layer of a sealant film and a layer of a film having a higher stiffness than the sealant layer, said layer of higher stiffness being formed from a novel polypropylene blend.

In preferred embodiments of the multilayer film of the present invention, the film has a stiffness of at least 20 000 psi (approximately 135 MPa), and especially at least 25 000 psi (approximately 170 MPa). In other embodiments, the multilayer film has a stiffness of at least 21,000 psi, 22,000 psi, 23,000 psi, or 24,000 psi.

The present invention also provides a pouch containing a flowable material, said pouch being made from the previously described multi-layer film in tubular form and having transversely heat sealed ends.

The present invention further provides a process for making pouches filled with a flowable material, using a vertical form, fill and seal ("VFFS") apparatus, in which process each pouch is made from a flat web of film by forming a tubular film therefrom with a longitudinal seal and subsequently flattening the tubular film at a first position and transversely heat sealing said tubular film at the flattened position, filling the tubular film with a predetermined quantity of flowable material above said first position, flattening the tubular film above the predetermined quantity of flowable material at a second position and transversely heat sealing said tubular film at the second position, the improvement comprising making the pouches from a flat web of a film made from a multilayer film described previously. The VFFS processes and its modifications are described in U.S. Pat. No. 5,538,590 and are incorporated by reference herein in their entirety.

Although melt-index ranges are specified herein, it is understood that the polymers have melt indices typical of film-grade polymers.

The multi-layer films of the present invention have the ability to form a lap seal as well as a fin seal. They also substantially reduce the curl in the laminate.

Catalysts

In the present invention, linear ethylene based polymers, copolymers, terpolymers, etc. are made using the Ziegler-Natta catalysts, single-site catalysts, the metallocene catalysts, or a combination of such catalysts, depending upon the need for the type of polymer.

High pressure low density polyethylene, or HP-LDPE, was the original polyethylene to be polymerized from ethylene monomer. The "high pressure" refers to the rather extreme polymerization process conditions. Generally, "low density" refers to the 0.918-0.930 g/cm$^3$ range of polyethylene densities. The HP-LDPE molecules have complex branching patterns, with no easily distinguishable backbone. The polymer molecules are composed of a whole network of branches of various lengths, from short to long. The present invention makes use of HP-LDPE polymers which are relatively high in average molecular weight, in other words, low in melt-index (0.1-1.1 dg/min).

Development of the Ziegler-Natta catalysts allowed polyethylene (and polypropylene) to be polymerized under less extreme conditions, and, in particular, at lower pressures. The first Zeigler-Natta-catalyzed polyethylene was distinctly different from HP-LDPE in two ways: the molecules were very linear in nature, with essentially no branches, and the polyethylene could have a very high density (~0.960 g/cm$^3$) because the linear molecules could pack together closely to form extensive crystalline domains in the solid polymer. High density polyethylene, in general, has a density of at least 0.935 g/cm$^3$.

As the use of Zeigler-Natta catalysts continued, it was discovered that the density of the linear polyethylene could be controlled and lowered by introducing a comonomer, in addition to the ethylene, for example, butene, hexene or octene. In fact, any low molecular-weight alpha-olefin suitably reacts with ethylene and breaks up the regularity of the linear chain development during polymerization—the alpha-olefin double bond at the end of the molecule opens up as it reacts, allowing the carbons on either side to become part of the linear back-bone, with the remainder of the alpha-olefin molecule becoming a short side chain. The short side chain disrupts polymer crystallization and lowers density: the more side chains that are present, the lower the polymer density.

Processes for the commercial manufacture of linear polyethylene have been known for more than thirty years. Such processes may be operated at temperatures above the solubilization temperature of the polymer in which event the polymer remains in solution, or the processes may be operated below the solubilization temperature in which event the polymer remains as a slurry in the polymerization solvent. Processes are also known in which the polymerization is conducted in the gas phase in the absence of solvent. The catalysts used are frequently based on titanium and are referred to as coordination catalysts; such catalysts may also be described as multi-site catalysts or heterogeneous catalysts. The polymer obtained is linear in nature, as opposed to the branched nature of high pressure polyethylene. Linear low density polyethylene is obtained by the co-polymerization of ethylene with at least one $C_4$-$C_{10}$ alpha-olefin hydrocarbon comonomer, examples of which include butene-1, hexene-1 and octene-1. The linear low density polyethylene has a density in the range of 0.909 to 0.935 g/cm$^3$, preferably 0.912 to 0.930 g/cm$^3$ and especially in the range of 0.912 to 0.926 g/cm$^3$. In other embodiments, the linear low density polyethylene has a density in the range defined by any two numbers from about 0.909, about 0.910, about 0.911, ..., about 0.933, about 0.934, and about 0.935 g/cm$^3$. In addition the polymer has a melt-index in the range of 0.3 to 10.0 dg/min, preferably 0.3 to 2.0 dg/min and especially in the range of 0.5 to 1.5 dg/min. In other embodiments, the melt-index is in the range defined by any two numbers from about 0.3, about 0.4, about 0.5, ..., about 9.8, about 9.9, and about 10.0 dg/min.

Figure 9:
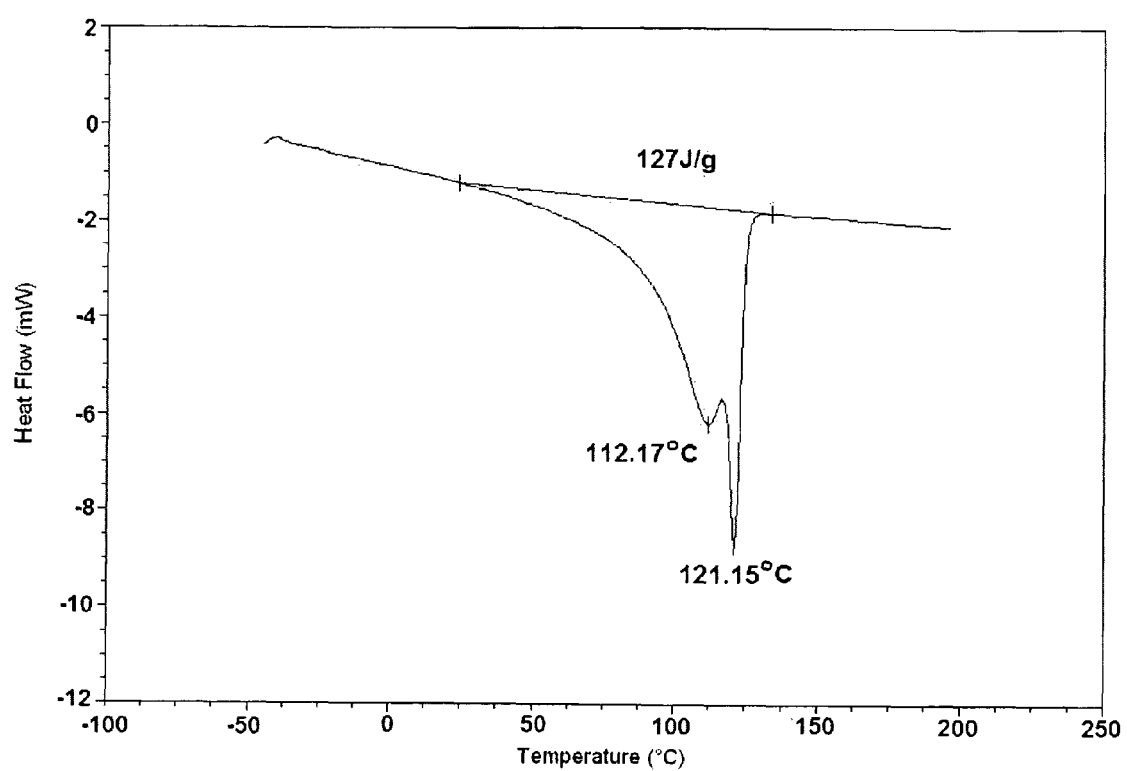
FIG. 9 shows the DSC melting curve for a heterogeneous linear low density polyethylene copolymer polymerized using a traditional Ziegler-Natta catalyst.

Traditional Ziegler-Natta catalysts produce heterogeneous LLDPE polymers. This is because both the molecular weight and the extent of comonomer incorporation vary considerably from molecule to molecule. The heterogeneity of the Ziegler-Natta polymerized LLDPE polyethylene can be detected from the relatively broad, multi-peak, DSC melting (or freezing) curve, as illustrated in FIG. 9. The peak melting is observed at about 125° C. with a lower-temperature broader peak. High molecular weight molecules, with very little incorporated comonomer, produce the major peak (very similar to the original linear polyethylene homopolymer). Melting copolymers (with a wide range of molecular weights and comonomer contents) produce the broader peak. The lowest melting portion, also known as the grease fraction, comprises low molecular-weight molecules. Low molecular-weight molecules incorporate higher number of comonomers that increases branch concentration. The grease fraction lubricates the higher molecular-weight linear polyethylene, improving its extrudability. As the grease fraction increases, however, the polymer clumps together impeding the pelletized polymer flow. Therefore, the use of Zeigler-Natta-catalyzed polyethylene has generally been limited to higher than 0.912 g/cm$^3$ density polymers.

It was theorized that different Zeigler-Natta catalyst sites encouraged growth of different types of polymer chains resulting in heterogeneous polyethylene. Therefore, single site catalysts were developed, which would produce homogeneous LLDPE polymers, which were more uniform with respect to molecular weight distribution and comonomer incorporation. Thus, polyethylenes with densities from as low as 0.800 to as high as 0.965 g/cm$^3$ are now possible. However, the latest expansion of the density range (below about 0.912 g/cm$^3$) has taken place only since the development of the single-site catalyst, also known in some versions as the Metallocene catalyst.

Figure 10:
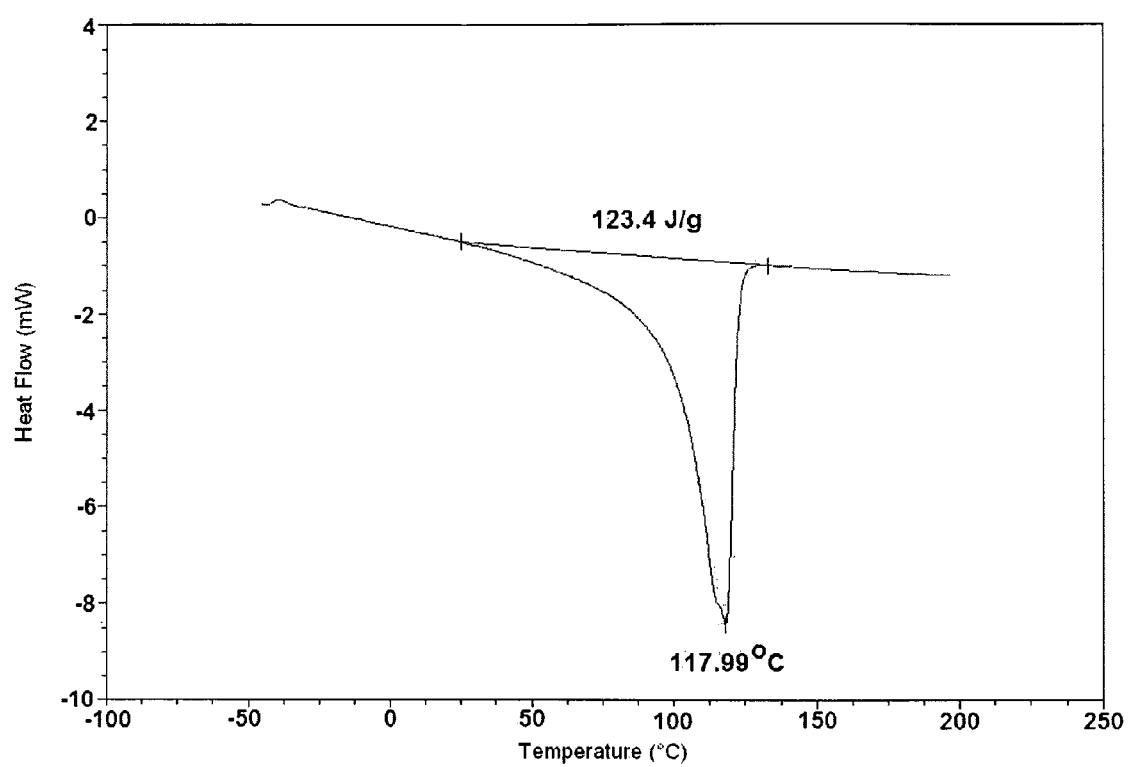
FIG. 10 shows the DSC curve for a homogenous linear low density polyethylene copolymer polymerized using a single site catalyst.

U.S. Pat. No. 3,645,992 describes single-site catalysts capable of producing homogeneous polyethylenes. The homogeneity occurs because the molecules are much more similar to one another in terms of molecular weight and comonomer concentration. In other words, the high-molecular weight tail and the grease fraction are both largely eliminated with the DSC melting curve showing a single melting peak, as a result, as illustrated in FIG. 10. Cleanly flowing pellets, with no greasy feel, could be produced with densities as low as 0.800 g/cm$^3$. These catalysts are called single-site catalysts because all catalyst sites encourage the growth of relatively similar polymer chains.

"Single-site catalysts" include metallocene or constrained-geometry catalysts. Metallocene catalysts are organometallic co-ordination compounds obtained as a cyclopentadienyl (Cp) derivative of a transition metal or metal halide. The metal bonds to the Cp ring by electrons moving in orbitals extending above and below the plane of the ring (pi-bond). Metallocene catalysts systems are extremely sensitive to the geometry of the catalytic site at the transition metal (the "single-site"). Examples of single-site catalysts include $Cp_2$, $TICl_2$, $Cp_2ZrCl_2$, $Cp_2HfCl_2$, $(C_5(CH_3)_2)_3TiCl_2$, $PH_2Me$ $(Ind)_2 ZrCl_2$, $[Me_4CpSi(Me)_2N(t-Bu)]TiCH_2[o-PhN(Me_2)]$, $Cp_2$, $FeB(C_2F_2)_4$.

The ethylene copolymer made with single-site catalyst may be obtained using a variety of polymerization processes of the type described above for the manufacture of linear low density polyethylene, for example, processes that operate in solution, in the gas phase and as a slurry process; references to the use of single site catalysts in polymerization processes is made in Modern Plastics, p. 15, May 1993, Plastics Focus Vol. 25, No. 12, Jun. 21, 1993 and in Exxon Chemical Exact Facts, Vol. 1, No. Feb. 1, 1993. Such polymers are obtained by the copolymerization of ethylene with at least one $C_4$-$C_{10}$ alpha-olefin hydrocarbon comonomer, examples of which include butene-1, hexene-1, and octene-1. The catalyst used is a so-called single-site catalyst, certain of which may also be referred to as metallocene or constrained geometry catalysts.

In the present invention, if the linear polyethylene obtained with the single site catalyst is a low-density copolymer of ethylene and an at least one $C_4$-$C_{10}$ alpha-olefin, then it has a density in the range of 0.905 to 0.935 g/cm³, preferably in the range 0.909 to 0.930, and especially in the range 0.912 to 0.926 g/cm³. In other embodiments, the density range can be defined by any two numbers from about 0.905, about 0.906, about 0.907, . . . , about 0.933, about 0.934, and about 0.935 g/cm³. In addition the low density copolymer has a melt-index in the range of 0.3 to 10.0 dg/min, preferably 0.3 to 2.0 dg/min and especially in the range of 0.5 to 1.5 dg/min. In other embodiments, the melt-index is in the range defined by any two numbers from about 0.3, about 0.4, about 0.5, . . . , about 9.8, about 9.9, and about 10.0 dg/min.

If the linear polyethylene is used as a minor blend component, and is an ultra-low-density copolymer of ethylene and an at least one $C_4$-$C_{10}$ alpha-olefin, then it preferably has a density in the range of 0.8 to 0.909 g/cm³, moreover in the range of 0.859 to 0.905 g/cm³, and especially in the range of 0.859 to 0.888 g/cm³. In other embodiments, the density range can be defined by any two numbers from about 0.800, about 0.801, about 0.803, . . . , about 0.907, about 0.908, and about 0.909 g/cm³. In addition, the ultra-low-density polymer preferably has a melt-index of less than 5 dg/min, particularly in the range of 0.4 to 1.1 dg/min and especially in the range of 0.4 to 0.6 dg/min. In other embodiments, the melt-index is in the range defined by any two numbers from about 0.4, about 0.5, about 0.6, . . . , about 0.9, about 1.0, and about 1.1 dg/min. In either case, the preferred copolymers include ethylene/butene-1, ethylene/hexene-1, ethylene/octene-1 and ethylene/hexene-1/butene-1 terpolymers.

Polypropylene is also polymerized using Zeigler-Natta, or single-site catalysts, or combinations of these catalysts.

Isotactic polypropylene homopolymer is a homogeneous polymer normally polymerized in a single stage reaction. It has a single clean DSC melting peak in the region 160-165° C. as illustrated in FIG. 3 of the accompanying drawings.

Homogeneous polypropylene interpolymers ("homoPP") also consist of a single phase, and have a single clean DSC melting peak, which occurs at a lower temperature than that of the homopolymer. The energy of inciting of the homogeneous interpolymer is also somewhat lower than that of the homopolymer. A typical DSC melting curve for a homogeneous propylene-ethylene interpolymer is illustrated in FIG. 4 of the accompanying drawings.

Heterogeneous polypropylene interpolymers ("HOPI") are formed in a two stage reaction. In the first stage, a crystalline network of isotactic polypropylene homopolymer or homogeneous polypropylene interpolymer is formed. In the second stage, a largely amorphous rubbery phase is formed within the crystalline network. A portion of the polymer formed in the second stage reaction is normally rich enough in comonomer, to be able to crystallize to form a third phase. When the comonomer is ethylene, the third phase normally has a DSC melting peak in the 120-125° C. region as illustrated in FIG. 5 of the accompanying drawings.

The second component polypropylene ("HEPI*") of the invention is chosen from a subset of the heterogeneous polypropylene interpolymers ("HEPI"). This subset is characterized by the second stage of the polymerization process, used to produce the heterogeneous polypropylene interpolymer, being extremely efficient in producing amorphous rubbery polymer to the extent that almost no crystalline third phase is produced.

As a result, the DSC melting curves for these special heterogeneous polypropylene interpolymers (FIG. 8) are quite different from those for typical heterogeneous polypropylene interpolymers (FIG. 5). The low-temperature peak is almost completely absent, making the curve look more like that for a homopolymer or homogeneous interpolymer (FIG. 3 or 4). However, the energy of melting for the heterogeneous polypropylene interpolymer used in the present blend is lower than that of either the homopolymer or the homogeneous copolymer. A slight shoulder may be observable in the temperature region 120-125° C.

The blends useful in the present invention may be made by blending the constituents prior to feeding to the hopper of a film extruder, or may be made by blending the constituents at the time of extrusion just prior to remelting in the extruder, or alternatively the constituents may be melt blended in the extruder.

The ethylene/alpha-olefin copolymer or blend of ethylene/alpha-olefin copolymers, for example, in pellet form, may be extruded into film form using known techniques. One preferred method of manufacturing film is the so-called blown film process. The film, after manufacture, is slit longitudinally into appropriate widths. The width is selected on the basis of the diameter of the tube to be formed on the vertical form, fill and seal apparatus. The preferred method of manufacture of a multilayer film is by using a blown film co-extrusion process, although other methods of manufacture of the film may be used.

The multilayer film of the invention is particularly useful in the formation of pouches, especially using a form, fill and seal apparatus. The pouches of the present invention may be used in the packaging of flowable materials, for example, liquids, as defined above. In particular, the pouches may be used in the packaging of milk.

In particular, the multilayer film provides increased stiffness, compared to the monolayer sealant film, increased clarity compared to film made entirely from the novel polypropylene blend, and further improves efficiencies in the runnability and sealability of monolayer and prior art multilayer films as described herein.

Other Additives

In the present invention, sealant layers can have a combined weight of 0-10 wt % of extrusion aid masterbatches including slip, antiblock and process aid. Interposed layers and core layers can have 0-2 wt % of slip masterbatches.

It will be understood by those skilled in the art that additives such as antioxidants, UV stabilizers, anti-block agents, and slip additives, may be added to the polymers from which the pouches of the present invention are made. Optionally, the inner-sealant layer, the outer-sealant layer, the core and/or the first or the second interposed layer may further comprise one or several additives useful to make easier the processing of a film in a VFFS system, such as, for example, polymer processing aids concentrate, and/or slip/antiblock concentrates. Any of such additives well known to person skilled in the art can be used. Advantageously, the following additives are particularly preferred.

Slip Agent

The preferred range of the slip agent is from about 200 to 2000 ppm. A preferred slip agent is erucamide or other fatty acid amide such as oleamide. The slip agent lowers the coefficient friction of the film and allows it to slide readily over various surfaces.

Anti-Blocking Agent 1000 to 5000 ppm of any film anti-blocking agent well known to skilled workman maybe added to the film layers. Preferably from 1000 to 8000 ppm of an anti-blocking material such as diatomaceous earth, synthetic silica or talc will be added to the inner and outer layers of the film. The anti-blocking material is particularly useful in reducing the coefficient of friction between the film and the metallic surfaces over which the film is drawn during the VFFS process.

Processing Aid 50 to 1000 ppm of any processing aid well known to skilled workman, preferably and not limitatively containing a fluoro-elastomer based polymer, maybe added to outer and inner skin layers of the film.

Pouch-Making Processes

Pouch-making processes for VFFS are known in the art, for example, in U.S. Patent Publication No. 2007/0254119, which is incorporated by reference herein. The invention at hand also relates to a process for making pouches filled with a flowable material, generally using a VFFS apparatus, wherein each pouch is made from a flat web of film by the following steps:

(I) forming a tubular film therefrom with a longitudinal seal and subsequently flattening said tubular film at a first position;

(II) transversely heat-sealing said tubular film at the flattened position;

(III) filling said tubular film with a predetermined quantity of flowable material above said first position;

(IV) flattening said tubular film above the predetermined quantity of flowable material at a second position; and (V) transversely heat sealing said tubular film at said second position, wherein said pouches are made from a flat web of film made from a multi-layer film, comprising the following layers in order of an at least one inner sealant-layer to an at least one outer sealant-layer:

(A) said at least one inner sealant-layer comprising polyethylene that is selected from the group consisting of:
  (i) an at least one low-density ethylene-alpha-olefin copolymer,
  (ii) a blend of said at least one low-density ethylene-alpha-olefin copolymer and an at least one ethylene homopolymer, wherein said ethylene homopolymer is made in a high-pressure polymerization process; and
  (iii) a blend of said at least one low-density ethylene-alpha-olefin copolymer and an at least one ethylene copolymer, wherein said ethylene copolymer is made in a high-pressure polymerization process;

(B) a first at least one interposed layer adjacent to said at least one inner sealant-layer, said first at least one interposed layer comprising:
  (i) an at least one polypropylene blend comprising a major component polypropylene and a minor component polypropylene, wherein said major component polypropylene in the range of from about 50% to 90% of weight of said first at least one interposed layer, and said minor component polypropylene is in the range of from about 10% to about 49% of weight of said first at least one interposed layer;
  (ii) optionally, an at least one ethylene-alpha-olefin copolymer; and
  (iii) optionally, a second ethylene-alpha-olefin copolymer that is not the same as said at least one ethylene-alpha-olefin copolymer in (B)(ii);
  wherein the centerline of said first at least one interposed layer is closer to the centerline of said at least one inner sealant-layer than to the centerline of said multi-layer film;

(C) at least one core layer, adjacent to said first at least one interposed layer, said at least one core layer comprising polyethylene that is selected from the group consisting of:
  (i) at least one low-density ethylene-alpha olefin copolymer,
  (ii) a blend of said at least one low-density ethylene-alpha-olefin copolymer and an at least one ethylene homopolymer, wherein said ethylene homopolymer is made in a high-pressure polymerization process; and
  (iii) a blend of said at least one low-density ethylene-alpha-olefin copolymer and an at least one ethylene copolymer, wherein said ethylene copolymer is made in a high-pressure polymerization process;

(D) a second at least one interposed layer adjacent to said at least one core layer, said second at least one interposed layer comprising:
  (i) an at least one polypropylene blend comprising a major component polypropylene and a minor component polypropylene, wherein said major component polypropylene in the range of from about 50% to 90% of weight of said first at least one interposed layer, and said minor component polypropylene is in the range of from about 10% to about 49% of weight of said first at least one interposed layer;
  (ii) optionally, an at least one ethylene-alpha-olefin copolymer; and
  (iii) optionally, a second ethylene-alpha-olefin copolymer that is not the same as said at least one ethylene-alpha-olefin copolymer in (D)(ii);
  wherein the centerline of said second at least one interposed layer is closer to the centerline of said at least one outer sealant-layer than to the centerline of said multi-layer film; and (E) said at least one outer sealant-layer, comprising polyethylene that is selected from the group consisting of:
  (i) an at least one low-density ethylene-alpha-olefin copolymer;
  (ii) a blend of said at least one low-density ethylene-alpha-olefin copolymer and an at least one ethylene homopolymer, wherein said ethylene homopolymer is made in a high-pressure polymerization process; and
  (iii) a blend of said at least one low-density ethylene-alpha-olefin copolymer and an at least one ethylene copolymer, wherein said ethylene copolymer is made in a high-pressure polymerization process;

wherein said multi-layer film thickness is in the range of from about 35 microns to about 66 microns;
wherein a combined thickness of said first at least one interposed layer and said second at least one interposed layer is in the range of from about 10% to about 27% of the total thickness of said multi-layer film; and
wherein a combined thickness of said inner sealant-layer and said outer sealant-layer is in the range of from about 10% to about 27% of the total thickness of said multi-layer film.

Abbreviations
BUR Blow-up ratio
DSC Differential Scanning calorimetry
EMA Ethylene methacrylate
EMAC Ethylene methacrylate copolymer
EPDM Ethylene propylene diamine rubber
EVA Ethylene-vinyl acetate
HEPI heterogeneous polypropylene interpolymer
HEPI* special heterogeneous polypropylene interpolymer used as minor, or second, component in the novel polypropylene blends of the invention
homoPP homopolymer polypropylene polymerized solely from propylene monomer
HOPI homogeneous polypropylene interpolymer
HP-LDPE High-pressure, low-density polyethylene
LLDPE linear low-density polyethylene
MWD/SCBD Molecular weight/Short-chain branching distribution
PI polypropylene interpolymer polymerized from propylene and at least one additional alpha-olefin monomer
PP Polypropylene
TCB Trichlorobenzene
ULDPE Ultra low-density polyethylene
VA Vinyl acetate
VFFS Vertical Form, Fill, and Seal

EXPERIMENTAL

In the present set of experiments, generally, a multi-layer film is made using film extrusion processes that are well-known to the film manufacturing industry. The multi-layer film is extruded on a five-layer blown-film co-extrusion line. Films from the resin compositions of this invention can also be made using other film extrusion processes which are well-known to the film manufacturing industry.

In one embodiment of the invention, which is a five-layer multi-layer film, the inner sealant-layer is designated as Layer A, the first interposed layer is designated as Layer B, the core layer is designated as Layer C, the second interposed layer is designated as Layer D, and the outer sealant-layer is designated as Layer E.

Three extruders ($E_A$, $E_B$, $E_C$) feed an eight-inch diameter circular die used for preparing the film. Extruder $E_A$ feeds the outer sealant-layer (Layer E) and the inner sealant-layer (Layer A). The "sealant layer" extruder, $E_A$, is a 2-inch diameter, single-screw extruder. Extruder $E_C$ feeds the first interposed layer (Layer B), and the second interposed layer (Layer D). The "interposed layer" extruder, $E_C$, is also a 2-inch diameter, single-screw extruder. Extruder $E_B$ feeds the core layer (Layer C). The "core layer" extruder $E_B$ is a larger 4-inch diameter, single-screw extruder.

The co-extrusion line includes an oscillating nip, a corona-treater, an edge guide, and a back-to-back winder with slit-in-line that is capable of being surface-driven or centre-driven. The width of the tower nip and winder also allow for blow-up ratios ("BUR") up to about 4:1. Preferably, the BUR range from 1.5 to 2.8, which provides a stable process and good film quality. The melt processing temperatures of the resins in the extruders ranged from 150° C. to 260° C. Processing additives such as slip and antiblock are incorporated into the resins as supplied or otherwise dry-blended in the form of additive concentrates, or melt-compounded into the resins through melt-compounding processes.

In one embodiment, the films are made at a BUR of 2:1. The films are wound as a flattened tube and slit to a narrower width.

For illustrative purposes, films with 13 different EXAMPLE resin recipes are manufactured on the coextrusion line as described. The films are made with a total thickness of 52 microns and the following layer thicknesses: A=4 microns, B=6 microns, C=32 microns, D=6 microns and E=4 microns.

The films are run on the Prepac IS-7E filler to assess runnability, to make pouches for evaluating in a pitcher, and to make pouches for a pouch drop test. Pouches are made from the above-described multi-layer films (also see multi-layer film formulations, infra) using the VFFS process. It is normal to make pouches containing 1.3 liters of water, at a temperature of 4.0+/−0.5° C., from a 24-cm wide film web; however, it is possible to make other pouch sizes if this is more relevant to the specific end-use. The Prepac IS-7E vertical form, fill and seal apparatus is normally equipped with an insulated transverse sealing jaw (U.S. Pat. No. 5,538,590) and easy mount transverse sealing element (PCT/CA98/0066 or equivalent). The web of film is formed into a continuous tube with a lap seal, said tube having an inside diameter of approximately 9.8 cm. The operation of the vertical and transverse sealing elements should be optimized for the particular film type and thickness used. It will be recognized that the sealing conditions (for example, amperage, voltage, dwell time) depend on the gauge and melting characteristics of the film. For example, a 50 µm film would require lower amperage and voltage, as controlled by the rheostat on the apparatus, than would a 75 µm film. Typically such a change in film thickness requires an adjustment of approximately 10% of the rheostat range.

The drop test can be a constant height pouch drop test, or a Bruceton stair drop test, where the drop height is varied in a systematic way. Both procedures are adaptations of ASTM D5276: Drop Test of Loaded Containers by Free Fall. It should be verified that the pouches in the different batches have very similar mean and standard deviation values for weight, length, and headspace.

Constant Height Drop Test (Version of ASTM D 5276 A2.2.1)

To compare the performance of one pouch film against another, at least 200 well-made pouches should be manufactured from each film and dropped from a constant initial height in the range 10-15 feet. The pouches should be dropped before the water in them has had a chance to warm up appreciably. Each pouch is positioned with the longitudinal axis of the tube i.e. pouch, coincident with an imaginary horizontal line, the bottom surface of the pouch at the initial drop height, and the vertical seal facing upwards. In this orientation, the pouch is dropped onto a stainless steel sheet, and then inspected visually and tactilely for leakers. Any pouch, from which water flows or weeps after the pouch has been dropped, is termed a "leaker". The number of leakers, expressed as a percentage of the total number of pouches dropped is the M(1.3)-test value for the particular film being tested, where 1.3 denotes the pouch size in liters.

Bruceton Stair Drop Test (Version of ASTM D5276 A2.4.2)

The Bruceton Stair test is more discriminating, and requires only 40-50 well-made pouches. The first pouch is positioned with the longitudinal axis of the tube i.e. pouch, coincident with an imaginary horizontal line, the bottom surface of the pouch at a suitable initial drop height, say 8 feet, and the vertical seal facing upwards. In this orientation, the pouch is dropped onto a stainless steel sheet, and then inspected visually and tactilely for leakers.

If the first pouch survives the drop test intact without leaking water, then a new pouch is selected and dropped from a height of an additional 0.5 feet, that is, 8.5 feet. On the other hand, if the first pouch is a leaker, then a new pouch is selected and dropped from a height, which is lower by 0.5 feet, that is 7.5 feet. The testing continues, using a new pouch for every drop, until at least 5 passes and 5 failures have occurred in the height range where both passes and failures are occurring. The 50% failure height is then calculated using the statistical method of ASTM D5628.

$^{13}$C NMR Measurements

The $^{13}$C-NMR method used to determine the weight percent propylene in the polypropylene homopolymers and interpolymers is the method described by J. C. Randall in his paper "Sequence Distributions versus Catalyst Site Behavior of in Situ Blends of Polypropylene and Poly(ethylene-co-propylene)", Journal of Polymer Science: Part A: Polymer Chemistry, Vol. 36, 1527-1542 (1998), all of the contents of which are incorporated herein by reference.

Xylene Extraction Procedure

The amorphous fraction of a polypropylene interpolymer can be estimated by measuring the xylene soluble fraction of that polymer.

A 2.5 g polymer sample is heated to reflux and dissolved in 100 mL of mixed xylenes in a 250-mL round bottom flask. The flask is heated with stirring using a heating mantel with the top of the flask insulated. The heating mantel is then turned off and the flask is allowed to cool slowly (with the insulation in place), to room temperature, overnight. The flask and contents are weighed to determine the final solvent weight. The contents are filtered first through a Tyler 200-mesh (75-micron) stainless steel screen and then through a Tyler 400-mesh (38-micron) screen. A weighed 20 mL aliquot of filtrate is placed into a 25-ml, septum-topped vial. The vial is placed in a heated block (80° C.) and blown down to dryness under nitrogen purge (200 mL/min). The xylene soluble fraction is calculated from the dry residue weight.

Molecular Weight Measurement

The molecular weight distributions of the relevant polymers are determined using size exclusion chromatography (SEC or GPC).

The SEC/MALS/Visc analyses are performed using a Polymer Laboratories PL210 high-temperature liquid chromatograph. The solvent used is trichlorobenzene (TCB) purchased from Burdick & Jackson (B & J Brand), and used without further purification. A 0.043 wt % butylated hydroxy toluene (2.5 g in 4 L of TCB with density of 1.454 g/cm$^3$ at 20° C.) is added to the mobile phase to minimize oxidative degradation. The TCB solvent passes through an on-line degasser prior to the injector compartment and the columns. The columns are housed in an integral oven maintained at 140° C. Sample solutions are prepared in the same solvent at 5.0-7.5 mg/mL in loosely-capped, 2-mL vials that are and then placed in a heating block at 140° C. overnight. Vials are then crimped and re-weighed to determine the final concentration before loading onto the sample carousel. The density of the TCB at 140° C. is 1.32 g/cm$^3$. The carousel is held at a reduced temperature of 100° C. to minimize oxidative degradation at the elevated temperatures, since some vials remain in the carousel for many hours prior to analysis. A few hours before injection, vials are rotated into the higher temperature compartment prior to injection.

The columns used are four 30 cm long Mixed A-LS SEC columns from Polymer Laboratories. The multi-angle light scattering instrument is a Wyatt Technology, high-temperature, Dawn DSP. The eluent flows from the columns through a microbore heated transfer line to the external light scattering instrument, and then back to the PL210 column compartment to the other detectors. The heated transfer line and the light scattering instrument are maintained at 140° C. and are controlled by the Wyatt instrument. The returning eluent then flows through the T-splitter to the Viscotek differential viscometer, which is housed within the heated column compartment, and to the differential refractometer, which also is housed within the heated column compartment before exiting the instrument. The interdetector volumes are determined by overlapping the refractive index, light scattering, and viscometry chromatograms for a narrow distribution PE standard. The interdetector volume from the light scattering detector to the viscometer is 0.3 μL; and from the viscometer to the differential refractometer is 0.3 μL. The entire instrument and heating block are housed within a ventilated enclosure.

Data are acquired using the Astra IV software from Wyatt Technology. The AUX1 channel is used to acquire the signal from the differential refractometer, and the AUX2 channel is used to acquire the data from the differential viscometer. The 18 scattering angles are all acquired independently, resulting in 20 chromatograms for each injection. Typically, only the 90° scattering angle chromatogram is displayed, however scattering from all angles is utilized to extract the data at each "slice" of the distribution using the usual light scattering equation valid at this high dilution where concentration effects are negligible.

The detectors at each scattering angle have a different response factor. These are normalized by analyzing three, low molecular-weight, narrow-distribution, linear polyethylenes. The accuracy of these procedures is ascertained using several polyethylene standards, including 3 NIST standards as well as other higher molecular-weight linear polyethylene standards. Molecular weights agreed with the MST certified data within 5%.

Extrusion Aid Masterbatches

For the experimental examples described below, extrusion aids such as slip and anti-block are purchased as pelletized masterbatches from Ingenia Polymers (Houston, Tex.). The active ingredient is compounded into a polyethylene carrier resin, usually a 2-10 MI LLDPE resin.

TABLE B

| Masterbatch | Active Ingredient | Concentration | Function |
| --- | --- | --- | --- |
| Ingenia IP1065 | erucamide | 5 wt % | slip |
| Ingenia IP1061A | oleamide | 5 wt % | slip |
| Ingenia IP1142 | fluoropolymer cpd | 4 wt % | metal coating |
| Ingenia IT719 | talc | 30 wt % | antiblock |
| Ingenia IP1051 | silica | 25 wt % | antiblock |

A pellet blend of the major polyethylene resins, and these masterbatches, is fed to each extruder of the co-extrusion line. The various components of the pelletized mixture are fed into the main extruder hopper via satellite blenders, the rates of which can be set to achieve the desired mix ratio.

Example 1

Layers of the Multi-layer Film 1 are prepared with the resins and additives shown in Table 1.

TABLE 1

Formulation for Multi-layer Film 1

| Resin Grade/ Trade Name* | Supplier | Weight % of Layer | Polymer Type | Comonomer | Catalyst in Resin Manufacture | MWD/SCBD | Resin Density g/cm³ | Melt-index deci g/min |
|---|---|---|---|---|---|---|---|---|
| Inner & Outer Sealant-Layer (A & E); Extruder $E_A$ ||||||||| 
| Elite 5100G | Dow | 95 | LLDPE | Octene | Single Site Reactor Blend | Heterogeneous | 0.920 | 0.85 |
| IP1065 | Ingenia | 2.0 | LLDPE carrier | — | — | — | 0.920 | 2-10 MI carrier |
| IP1051 | Ingenia | 2.0 | LLDPE carrier | — | — | — | 1.000 | 2-10 MI carrier |
| IP1142 | Ingenia | 1.0 | LLDPE carrier | — | — | — | 0.930 | 2-10 MI carrier |
| First & Second Interposed-Layer (B & D); Extruder $E_C$ ||||||||| 
| Inspire PP D114 | Dow | 65.0 | HEPI | minor component ethylene | Single Site Reactor Blend | Heterogeneous | 0.90 | 0.50 |
| Adflex Q100 | Lyondell-Basell | 33.0 | HEPI* | Propene major and ethylene minor component | Zeigler-Natta | Heterogeneous | 0.890 | 0.60 |
| IP1065 | Ingenia | 2.0 | LLDPE carrier | — | — | — | 0.920 | 2-10 MI carrier |
| Core-Layer (C); Extruder $E_B$ ||||||||| 
| Elite 5100G | Dow | 59.0 | LLDPE | Octene | Single Site Reactor Blend | Heterogeneous | 0.920 | 0.85 |
| PE 662I | Dow | 30.0 | HP-LDPE | None | High Pressure | Heterogeneous | 0.919 | 0.50 |
| Affinity PL1880 | Dow | 9.0 | ULDPE | Octene | Single Site | Homogeneous | 0.902 | 1.0 |
| IP1065 | Ingenia | 2.0 | LLDPE carrier | — | — | — | 0.920 | 2-10 MI carrier |

Example 2

Layers of the Multi-layer Film 2 are prepared with the resins and additives shown in Table 2.

TABLE 2

Formulation for Multi-layer Film 2

| Resin Grade/ Trade Name* | Supplier | Weight % of Layer | Polymer Type | Comonomer | Catalyst in Resin Manufacture | MWD/SCBD | Resin Density g/cm³ | Melt-index deci g/min |
|---|---|---|---|---|---|---|---|---|
| Inner & Outer Sealant-Layer (A & E); Extruder $E_A$ ||||||||| 
| Elite 5100G | Dow | 94.5 | LLDPE | Octene | Single Site Reactor Blend | Heterogeneous | 0.920 | 0.85 |
| IP1065 | Ingenia | 2.0 | LLDPE carrier | — | — | — | 0.920 | 2-10 MI carrier |
| IP1051 | Ingenia | 2.0 | LLDPE carrier | — | — | — | 1.000 | 2-10 MI carrier |
| IP1142 | Ingenia | 1.5 | LLDPE carrier | — | — | — | 0.930 | 2-10 MI carrier |
| First & Second Interposed-Layer (B & D); Extruder $E_C$ ||||||||| 
| TI4005F | Sunoco | 65.0 | HEPI | ethylene minor component | Zeigler-Natta | Heterogeneous | 0.90 | 0.50 |
| Adflex Q100 | Lyondell-Basell | 33.0 | HEPI* | ethylene minor component | Zeigler-Natta | Heterogeneous | 0.890 | 0.60 |
| IP1065 | Ingenia | 2.0 | LLDPE carrier | — | — | — | 0.920 | 2-10 MI carrier |
| Core-Layer (C); Extruder $E_B$ ||||||||| 
| Elite 5100G | Dow | 68.0 | LLDPE | Octene | Single Site Reactor Blend | Heterogeneous | 0.920 | 0.85 |
| PE 662I | Dow | 30.0 | HP-LDPE | None | High Pressure | Heterogeneous | 0.919 | 0.50 |
| IP1065 | Ingenia | 2.0 | LLDPE carrier | — | — | — | 0.920 | 2-10 MI carrier |

Example 3

Layers of the Multi-layer Film 3 are prepared with the resins and additives shown in Table 3.

TABLE 3

Formulation for Multi-layer Film 3

| Resin Grade/ Trade Name* | Supplier | Weight % of Layer | Polymer Type | Comonomer | Catalyst in Resin Manufacture | MWD/SCBD | Resin Density g/cm³ | Melt-index deci g/min |
|---|---|---|---|---|---|---|---|---|
| Inner & Outer Sealant-Layer (A & E); Extruder $E_A$ | | | | | | | | |
| Elite 5100G | Dow | 94.5 | LLDPE | Octene | Single Site Reactor Blend | Heterogeneous | 0.920 | 0.85 |
| IP1065 | Ingenia | 2.0 | LLDPE carrier | — | — | — | 0.920 | 2-10 MI carrier |
| IP1051 | Ingenia | 2.0 | LLDPE carrier | — | — | — | 1.000 | 2-10 MI carrier |
| IP1142 | Ingenia | 1.5 | LLDPE carrier | — | — | — | 0.930 | 2-10 MI carrier |
| First & Second Interposed-Layer (B & D); Extruder $E_C$ | | | | | | | | |
| TI4007F | Sunoco | 65.0 | HEPI | ethylene minor component | Zeigler-Natta | Heterogeneous | 0.90 | 0.70 |
| Borsoft SA233CF | Borealis | 33.0 | HEPI* | ethylene minor component | Zeigler-Natta | Heterogeneous | 0.905 | 0.80 |
| IP1065 | Ingenia | 2.0 | LLDPE carrier | — | — | — | 0.920 | 2-10 MI carrier |
| Core-Layer (C); Extruder $E_B$ | | | | | | | | |
| Elite 5100G | Dow | 68.0 | LLDPE | Octene | Single Site Reactor Blend | Heterogeneous | 0.920 | 0.85 |
| PE 662I | Dow | 30.0 | HP-LDPE | None | High Pressure | Heterogeneous | 0.919 | 0.50 |
| IP1065 | Ingenia | 2.0 | LLDPE carrier | — | — | — | 0.920 | 2-10 MI carrier |

Example 4

Layers of the Multi-layer Film 4 are prepared with the resins and additives shown in Table 4.

TABLE 4

Formulation for Multi-layer Film 4

| Resin Grade/ Trade Name* | Supplier | Weight % of Layer | Polymer Type | Comonomer | Catalyst in Resin Manufacture | MWD/SCBD | Resin Density g/cm³ | Melt-index deci g/min |
|---|---|---|---|---|---|---|---|---|
| Inner & Outer Sealant-Layer (A & E); Extruder $E_A$ | | | | | | | | |
| Elite 5100G | Dow | 94.5 | LLDPE | Octene | Single Site Reactor Blend | Heterogeneous | 0.920 | 0.85 |
| IP1065 | Ingenia | 2.0 | LLDPE carrier | — | — | — | 0.920 | 2-10 MI carrier |
| IP1051 | Ingenia | 2.0 | LLDPE carrier | — | — | — | 1.000 | 2-10 MI carrier |
| IP1142 | Ingenia | 1.5 | LLDPE carrier | — | — | — | 0.930 | 2-10 MI carrier |
| First & Second Interposed-Layer (B & D); Extruder $E_C$ | | | | | | | | |
| PP4170 | Total | 65.0 | HEPI | ethylene minor component | Zeigler-Natta | Heterogeneous | 0.905 | 0.75 |
| Adflex Q402F | Lyondell-Basell | 33.0 | HEPI* | ethylene minor component | Zeigler-Natta | Heterogeneous | 0.890 | 0.65 |
| IP1065 | Ingenia | 2.0 | LLDPE carrier | — | — | — | 0.920 | 2-10 MI carrier |
| Core-Layer (C); Extruder $E_B$ | | | | | | | | |
| Elite 5100G | Dow | 68.0 | LLDPE | Octene | Single Site Reactor Blend | Heterogeneous | 0.920 | 0.85 |
| PE 662I | Dow | 30.0 | HP-LDPE | None | High Pressure | Heterogeneous | 0.919 | 0.50 |
| IP1065 | Ingenia | 2.0 | LLDPE carrier | — | — | — | 0.920 | 2-10 MI carrier |

Example 5

Layers of the Multi-layer Film 5 are prepared with the resins and additives shown in Table 5.

TABLE 5

Formulation for Multi-layer Film 5

| Resin Grade/ Trade Name* | Supplier | Weight % of Layer | Polymer Type | Comonomer | Catalyst in Resin Manufacture | MWD/SCBD | Resin Density g/cm$^3$ | Melt-index deci g/min |
|---|---|---|---|---|---|---|---|---|
| *Inner & Outer Sealant-Layer (A & E); Extruder $E_A$* | | | | | | | | |
| Elite 5100G | Dow | 94.5 | LLDPE | Octene | Single Site Reactor Blend | Heterogeneous | 0.920 | 0.85 |
| IP1065 | Ingenia | 2.0 | LLDPE carrier | — | — | — | 0.920 | 2-10 MI carrier |
| IP1051 | Ingenia | 2.0 | LLDPE carrier | — | — | — | 1.000 | 2-10 MI carrier |
| IP1142 | Ingenia | 1.5 | LLDPE carrier | — | — | — | 0.930 | 2-10 MI carrier |
| *First & Second Interposed-Layer (B & D); Extruder $E_C$* | | | | | | | | |
| Profax7823 | Lyondell-Basell | 65.0 | HEPI | ethylene minor component | Zeigler-Natta | Heterogeneous | 0.900 | 0.45 |
| Adflex Q402F | Lyondell-Basell | 33.0 | HEPI* | ethylene minor component | Zeigler-Natta | Heterogeneous | 0.890 | 0.65 |
| IP1065 | Ingenia | 2.0 | LLDPE carrier | — | — | — | 0.920 | 2-10 MI carrier |
| *Core-Layer (C); Extruder $E_B$* | | | | | | | | |
| Elite 5100G | Dow | 68.0 | LLDPE | Octene | Single Site Reactor Blend | Heterogeneous | 0.920 | 0.85 |
| PE 662I | Dow | 30.0 | HP-LDPE | None | High Pressure | Heterogeneous | 0.919 | 0.50 |
| IP1065 | Ingenia | 2.0 | LLDPE carrier | — | — | — | 0.920 | 2-10 MI carrier |

Example 6

Layers of the Multi-layer Film 6 are prepared with the resins and additives shown in Table 6.

TABLE 6

Formulation for Multi-layer Film 6

| Resin Grade/ Trade Name* | Supplier | Weight % of Layer | Polymer Type | Comonomer | Catalyst in Resin Manufacture | MWD/SCBD | Resin Density g/cm$^3$ | Melt-index deci g/min |
|---|---|---|---|---|---|---|---|---|
| *Inner & Outer Sealant-Layer (A & E); Extruder $E_A$* | | | | | | | | |
| Affinity PL1840G | Dow | 92.5 | LLDPE | Octene | Single Site | Homogeneous | 0.909 | 1.00 |
| IP1065 | Ingenia | 2.0 | LLDPE carrier | — | — | — | 0.920 | 2-10 MI carrier |
| IP1061A | Ingenia | 2.0 | LLDPE carrier | — | — | — | 0.920 | 2-10 MI carrier |
| IP1051 | Ingenia | 2.0 | LLDPE carrier | — | — | — | 1.000 | 2-10 MI carrier |
| IP1142 | Ingenia | 1.5 | LLDPE carrier | — | — | — | 0.930 | 2-10 MI carrier |
| *First & Second Interposed-Layer (B & D); Extruder $E_C$* | | | | | | | | |
| Inspire PP D114 | Dow | 50.0 | HEPI | minor component ethylene | Single Site Reactor Blend | Heterogeneous | 0.90 | 0.50 |
| Adflex Q402F | Lyondell-Basell | 48.0 | HEPI* | ethylene minor component | Zeigler-Natta | Heterogeneous | 0.890 | 0.65 |
| IP1065 | Ingenia | 2.0 | LLDPE carrier | — | — | — | 0.920 | 2-10 MI carrier |
| *Core-Layer (C); Extruder $E_B$* | | | | | | | | |
| Surpass FPS117C | Nova | 68.0 | LLDPE | Octene | Single Site | Homogeneous | 0.917 | 1.0 |
| PE 662I | Dow | 30.0 | HP-LDPE | None | High Pressure | Heterogeneous | 0.919 | 0.50 |
| IP1065 | Ingenia | 2.0 | LLDPE carrier | — | — | — | 0.920 | 2-10 MI carrier |

Example 7

Layers of the Multi-layer Film 7 are prepared with the resins and additives shown in Table 7.

TABLE 7

Formulation for Multi-layer Film 7

| Resin Grade/ Trade Name* | Supplier | Weight % of Layer | Polymer Type | Comonomer | Catalyst in Resin Manufacture | MWD/SCBD | Resin Density g/cm$^3$ | Melt-index deci g/min |
|---|---|---|---|---|---|---|---|---|
| Inner & Outer Sealant-Layer (A & E); Extruder $E_A$ | | | | | | | | |
| Exceed 1015CE | Exxon-Mobil | 92.5 | LLDPE | Hexene | Single Site Reactor Blend | Heterogeneous | 0.915 | 1.00 |
| IP1065 | Ingenia | 2.0 | LLDPE carrier | — | — | — | 0.920 | 2-10 MI carrier |
| IP1061A | Ingenia | 2.0 | LLDPE carrier | — | — | — | 0.920 | 2-10 MI carrier |
| IT719 | Ingenia | 2.0 | LLDPE carrier | — | — | — | 1.140 | 2-10 MI carrier |
| IP1142 | Ingenia | 1.5 | LLDPE carrier | — | — | — | 0.930 | 2-10 MI carrier |
| First & Second Interposed-Layer (B & D); Extruder $E_C$ | | | | | | | | |
| Inspire PP D114 | Dow | 50.0 | HEPI | minor component ethylene | Single Site Reactor Blend | Heterogeneous | 0.90 | 0.50 |
| Adflex Q402F | Lyondell-Basell | 48.0 | HEPI* | ethylene minor component | Zeigler-Natta | Heterogeneous | 0.890 | 0.65 |
| IP1065 | Ingenia | 2.0 | LLDPE carrier | — | — | — | 0.920 | 2-10 MI carrier |
| Core-Layer (C); Extruder $E_B$ | | | | | | | | |
| Surpass FPS117C | Nova | 68.0 | LLDPE | Octene | Single Site | Homogeneous | 0.917 | 1.0 |
| PE 132I | Dow | 30.0 | HP-LDPE | None | High Pressure | Heterogeneous | 0.922 | 0.22 |
| IP1065 | Ingenia | 2.0 | LLDPE carrier | — | — | — | 0.920 | 2-10 MI carrier |

Example 8

Layers of the Multi-layer Film 8 are prepared with the resins and additives shown in Table 8.

TABLE 8

Formulation for Multi-layer Film 8

| Resin Grade/ Trade Name* | Supplier | Weight % of Layer | Polymer Type | Comonomer | Catalyst in Resin Manufacture | MWD/SCBD | Resin Density g/cm$^3$ | Melt-index deci g/min |
|---|---|---|---|---|---|---|---|---|
| Inner & Outer Sealant-Layer (A & E); Extruder $E_A$ | | | | | | | | |
| Affinity PL1840G | Dow | 92.5 | LLDPE | Octene | Single Site | Homogeneous | 0.909 | 1.00 |
| IP1065 | Ingenia | 2.0 | LLDPE carrier | — | — | — | 0.920 | 2-10 MI carrier |
| IP1061A | Ingenia | 2.0 | LLDPE carrier | — | — | — | 0.920 | 2-10 MI carrier |
| IP1051 | Ingenia | 2.0 | LLDPE carrier | — | — | — | 1.000 | 2-10 MI carrier |
| IP1142 | Ingenia | 1.5 | LLDPE carrier | — | — | — | 0.930 | 2-10 MI carrier |
| First & Second Interposed-Layer (B & D); Extruder $E_C$ | | | | | | | | |
| Inspire PP D114 | Dow | 50.0 | HEPI | minor component ethylene | Single Site Reactor Blend | Heterogeneous | 0.90 | 0.50 |
| Borsoft SA233CF | Borealis | 48.0 | HEPI* | ethylene minor component | Zeigler-Natta | Heterogeneous | 0.905 | 0.80 |
| IP1065 | Ingenia | 2.0 | LLDPE carrier | — | — | — | 0.920 | 2-10 MI carrier |
| Core-Layer (C); Extruder $E_B$ | | | | | | | | |
| Surpass FPS117C | Nova | 68.0 | LLDPE | Octene | Single Site | Homogeneous | 0.917 | 1.0 |
| PE 132I | Dow | 30.0 | HP-LDPE | None | High Pressure | Heterogeneous | 0.922 | 0.22 |
| IP1065 | Ingenia | 2.0 | LLDPE carrier | — | — | — | 0.920 | 2-10 MI carrier |

Example 9

Layers of the Multi-layer Film 9 are prepared with the resins and additives shown in Table 9.

TABLE 9

Formulation for Multi-layer Film 9

| Resin Grade/ Trade Name* | Supplier | Weight % of Layer | Polymer Type | Comonomer | Catalyst in Resin Manufacture | MWD/SCBD | Resin Density g/cm³ | Melt-index deci g/min |
|---|---|---|---|---|---|---|---|---|
| Inner & Outer Sealant-Layer (A & E); Extruder $E_A$ ||||||||| 
| Surpass FPs117C | Nova | 85.5 | LLDPE | Octene | Single Site | Homogeneous | 0.917 | 1.0 |
| Engage 8150 | Dow | 9.0 | ULDPE | Octene | Single Site | Homogeneous | 0.868 | 0.50 |
| IP1065 | Ingenia | 2.0 | LLDPE carrier | — | — | — | 0.920 | 2-10 MI carrier |
| IP1051 | Ingenia | 2.0 | LLDPE carrier | — | — | — | 1.000 | 2-10 MI carrier |
| IP1142 | Ingenia | 1.5 | LLDPE carrier | — | — | — | 0.930 | 2-10 MI carrier |
| First & Second Interposed-Layer (B & D); Extruder $E_C$ ||||||||| 
| Inspire PP D114 | Dow | 70.0 | HEPI | minor component ethylene | Single Site Reactor Blend | Heterogeneous | 0.90 | 0.50 |
| Adflex Q402F | Lyondell-Basell | 28.0 | HEPI* | ethylene minor component | Zeigler-Natta | Heterogeneous | 0.890 | 0.65 |
| IP1065 | Ingenia | 2.0 | LLDPE carrier | — | — | — | 0.920 | 2-10 MI carrier |
| Core-Layer (C); Extruder $E_B$ ||||||||| 
| Surpass FPs117C | Nova | 68.0 | LLDPE | Octene | Single Site | Homogeneous | 0.917 | 1.0 |
| PE 132I | Dow | 30.0 | HP-LDPE | None | High Pressure | Heterogeneous | 0.922 | 0.22 |
| IP1065 | Ingenia | 2.0 | LLDPE carrier | — | — | — | 0.920 | 2-10 MI carrier |

Example 10

Layers of the Multi-layer Film 10 are prepared with the resins and additives shown in Table 10.

TABLE 10

Formulation for Multi-layer Film 10

| Resin Grade/ Trade Name* | Supplier | Weight % of Layer | Polymer Type | Comonomer | Catalyst in Resin Manufacture | MWD/SCBD | Resin Density g/cm³ | Melt-index deci g/min |
|---|---|---|---|---|---|---|---|---|
| Inner & Outer Sealant-Layer (A & E); Extruder $E_A$ ||||||||| 
| Surpass FPs117C | Nova | 85.5 | LLDPE | Octene | Single Site | Homogeneous | 0.917 | 1.0 |
| Engage 8150 | Dow | 9.0 | ULDPE | Octene | Single Site | Homogeneous | 0.868 | 0.50 |
| IP1065 | Ingenia | 2.0 | LLDPE carrier | — | — | — | 0.920 | 2-10 MI carrier |
| IP1051 | Ingenia | 2.0 | LLDPE carrier | — | — | — | 1.000 | 2-10 MI carrier |
| IP1142 | Ingenia | 1.5 | LLDPE carrier | — | — | — | 0.930 | 2-10 MI carrier |
| First & Second Interposed-Layer (B & D); Extruder $E_C$ ||||||||| 
| Inspire PP D114 | Dow | 70.0 | HEPI | minor component ethylene | Single Site Reactor Blend | Heterogeneous | 0.90 | 0.50 |
| Adflex Q402F | Lyondell-Basell | 28.0 | HEPI* | ethylene minor component | Zeigler-Natta | Heterogeneous | 0.890 | 0.65 |
| IP1065 | Ingenia | 2.0 | LLDPE carrier | — | — | — | 0.920 | 2-10 MI carrier |
| Core-Layer (C); Extruder $E_B$ ||||||||| 
| Surpass FPs117C | Nova | 68.0 | LLDPE | Octene | Single Site | Homogeneous | 0.917 | 1.0 |
| PE 132I | Dow | 30.0 | HP-LDPE | None | High Pressure | Heterogeneous | 0.922 | 0.22 |
| IP1065 | Ingenia | 2.0 | LLDPE carrier | — | — | — | 0.920 | 2-10 MI carrier |

Example 11

Layers of the Multi-layer Film 11 are prepared with the resins and additives shown in Table 11.

TABLE 11

Formulation for Multi-layer Film 11

| Resin Grade/ Trade Name* | Supplier | Weight % of Layer | Polymer Type | Comonomer | Catalyst in Resin Manufacture | MWD/SCBD | Resin Density g/cm$^3$ | Melt-index deci g/min |
|---|---|---|---|---|---|---|---|---|
| *Inner & Outer Sealant-Layer (A & E); Extruder $E_A$* | | | | | | | | |
| Surpass FPs016C | Nova | 94.5 | LLDPE | Octene | Single Site | Homogeneous | 0.916 | 0.65 |
| IP1065 | Ingenia | 2.0 | LLDPE carrier | — | — | — | 0.920 | 2-10 MI carrier |
| IP1051 | Ingenia | 2.0 | LLDPE carrier | — | — | — | 1.000 | 2-10 MI carrier |
| IP1142 | Ingenia | 1.5 | LLDPE carrier | — | — | — | 0.930 | 2-10 MI carrier |
| *First & Second Interposed-Layer (B & D); Extruder $E_C$* | | | | | | | | |
| Inspire PP D114 | Dow | 55.0 | HEPI | minor component ethylene | Single Site Reactor Blend | Heterogeneous | 0.90 | 0.50 |
| Adflex Q402F | Lyondell-Basell | 28.0 | HEPI* | ethylene minor component | Zeigler-Natta | Heterogeneous | 0.890 | 0.65 |
| Surpass FPs117C | Nova | 15.0 | LLDPE | Octene | Single Site | Homogeneous | 0.917 | 1.0 |
| IP1065 | Ingenia | 2.0 | LLDPE carrier | — | — | — | 0.920 | 2-10 MI carrier |
| *Core-Layer (C); Extruder $E_B$* | | | | | | | | |
| Surpass FPs016C | Nova | 68.0 | LLDPE | Octene | Single Site | Homogeneous | 0.916 | 0.65 |
| PE 132I | Dow | 30.0 | HP-LDPE | None | High Pressure | Heterogeneous | 0.922 | 0.22 |
| IP1065 | Ingenia | 2.0 | LLDPE carrier | — | — | — | 0.920 | 2-10 MI carrier |

Example 12

Layers of the Multi-layer Film 12 are prepared with the resins and additives shown in Table 12.

TABLE 12

Formulation for Multi-layer Film 12

| Resin Grade/ Trade Name* | Supplier | Weight % of Layer | Polymer Type | Comonomer | Catalyst in Resin Manufacture | MWD/SCBD | Resin Density g/cm$^3$ | Melt-index deci g/min |
|---|---|---|---|---|---|---|---|---|
| *Inner & Outer Sealant-Layer (A & E); Extruder $E_A$* | | | | | | | | |
| Surpass FPs117C | Nova | 85.5 | LLDPE | Octene | Single Site | Homogeneous | 0.917 | 1.0 |
| Engage8150 | Dow | 9.0 | ULDPE | Octene | Single Site | Homogeneous | 0.868 | 0.50 |
| IP1065 | Ingenia | 2.0 | LLDPE carrier | — | — | — | 0.920 | 2-10 MI carrier |
| IP1051 | Ingenia | 2.0 | LLDPE carrier | — | — | — | 1.000 | 2-10 MI carrier |
| IP1142 | Ingenia | 1.5 | LLDPE carrier | — | — | — | 0.930 | 2-10 MI carrier |
| *First & Second Interposed-Layer (B & D); Extruder $E_C$* | | | | | | | | |
| Inspire PP D114 | Dow | 54.0 | HEPI | minor component ethylene | Single Site Reactor Blend | Heterogeneous | 0.90 | 0.50 |
| Adflex Q402F | Lyondell-Basell | 20.0 | HEPI* | ethylene minor component | Zeigler-Natta | Heterogeneous | 0.890 | 0.65 |
| Dowlex 2045G | Dow | 15.0 | LLDPE | Octene | Zeigler-Natta | Heterogeneous | 0.920 | 1.0 |
| Affinity PL1880 | Dow | 9.0 | ULDPE | Octene | Single Site | Homogeneous | 0.902 | 1.0 |
| IP1065 | Ingenia | 2.0 | LLDPE carrier | — | — | — | 0.920 | 2-10 MI carrier |
| *Core-Layer (C); Extruder $E_B$* | | | | | | | | |
| Surpass FPs117C | Nova | 73.0 | LLDPE | Octene | Single Site | Homogeneous | 0.917 | 1.0 |
| PE 132I | Dow | 25.0 | HP-LDPE | None | High Pressure | Heterogeneous | 0.922 | 0.22 |
| IP1065 | Ingenia | 2.0 | LLDPE carrier | — | — | — | 0.920 | 2-10 MI carrier |

Example 13

Layers of the Multi-layer Film 13 are prepared with the resins and additives shown in Table 13.

TABLE 13

Formulation for Multi-layer Film 13

| Resin Grade/ Trade Name* | Supplier | Weight % of Layer | Polymer Type | Comonomer | Catalyst in Resin Manufacture | MWD/SCBD | Resin Density g/cm³ | Melt-index deci g/min |
|---|---|---|---|---|---|---|---|---|
| *Inner & Outer Sealant-Layer (A & E); Extruder $E_A$* | | | | | | | | |
| Enable20-10CE | Exxon-Mobil | 95 | LLDPE | Hexene | Single Site Reactor Blend | Heterogeneous | 0.92 | 1.0 |
| Petrothene NA960 | Lyondell-Basell | 5 | HP-LDPE | None | High Pressure | Heterogeneous | 0.919 | 1.0 |
| *First & Second Interposed-Layer (B & D); Extruder $E_C$* | | | | | | | | |
| Inspire PP D114 | Dow | 61 | HEPI | minor component ethylene | Single Site Reactor Blend | Heterogeneous | 0.90 | 0.50 |
| Adflex Q402F | Lyondell-Basell | 28.0 | HEPI* | ethylene minor component | Zeigler-Natta | Heterogeneous | 0.890 | 0.65 |
| Affinity PL1880 | Dow | 9 | ULDPE | Octene | Single Site | Homogeneous | 0.902 | 1.0 |
| IP1065 | Ingenia | 2.0 | LLDPE carrier | Butene | Zeigler-Natta | Heterogeneous | 0.920 | 2-10 MI carrier |
| *Core-Layer (C); Extruder $E_B$* | | | | | | | | |
| Enable20-10CE | Exxon-Mobil | 85 | LLDPE | Hexene | Single Site Reactor Blend | Heterogeneous | 0.92 | 1.0 |
| Petrothene NA960 | Lyondell-Basell | 15 | HP-LDPE | None | High Pressure | Heterogeneous | 0.919 | 1.0 |

The invention claimed is:

1. A multi-layer film for making pouches for containing flowable materials, said multi-layer film comprising the following layers in order, from an at least one inner sealant-layer to an at least one outer sealant-layer:
   (A) said at least one inner sealant-layer comprising polyethylene that is selected from the group consisting of:
      (i) an at least one low-density ethylene-alpha-olefin copolymer,
      (ii) a blend of said at least one low-density ethylene-alpha-olefin homopolymer, wherein said ethylene homopolymer is made in a high-pressure polymerization process; and
      (iii) a blend of said at least one low-density ethylene-alpha-olefin copolymer and an at least one ethylene copolymer, wherein said ethylene copolymer is made in a high-pressure polymerization process;
   (B) a first at least one interposed layer adjacent to said at least one inner sealant-layer, said first at least one interposed layer comprising:
      (i) an at least one polypropylene blend comprising a major component polypropylene and a minor component polypropylene, wherein said major component polypropylene in the range of from about 50% to 90% of weight of said first at least one interposed layer, and said minor component polypropylene is in the range of from about 10% to about 49% of weight of said first at least one interposed layer;
      (ii) optionally, an at least one ethylene-alpha-olefin copolymer; and
      (iii) optionally, a second ethylene-alpha-olefin copolymer that is not the same as said at least one ethylene-alpha-olefin copolymer in (B)(ii);
   wherein the centerline of said first at least one interposed layer is closer to the centerline of said at least one inner sealant-layer than to the centerline of said multi-layer film;
   (C) at least one core layer, adjacent to said first at least one interposed layer, said at least one core layer comprising polyethylene that is selected from the group consisting of:
      (i) at least one low-density ethylene-alpha olefin copolymer,
      (ii) a blend of said at least one low-density ethylene-alpha-olefin copolymer and an at least one ethylene homopolymer, wherein said ethylene homopolymer is made in a high-pressure polymerization process; and
      (iii) a blend of said at least one low-density ethylene-alpha-olefin copolymer and an at least one ethylene copolymer, wherein said ethylene copolymer is made in a high-pressure polymerization process;
   (D) a second at least one interposed layer adjacent to said at least one core
      (i) an at least one polypropylene blend comprising a major component polypropylene and a minor component polypropylene, wherein said major component polypropylene in the range of from about 50% to 90% of weight of said first at least one interposed layer, and said minor component polypropylene is in the range of from about 10% to about 49% of weight of said first at least one interposed layer;
      (ii) optionally, an at least one ethylene-alpha-olefin copolymer; and
      (iii) optionally, a second ethylene-alpha-olefin copolymer that is not the same as said at least one ethylene-alpha-olefin copolymer in (D)(ii);
   wherein the centerline of said second at least one interposed layer is closer to the centerline of said at least one outer sealant-layer than to the centerline of said multi-layer film; and
   (E) said at least one outer sealant-layer, comprising polyethylene that is selected from the group consisting of:
      (i) an at least one low-density ethylene-alpha-olefin copolymer,
      (ii) a blend of said at least one low-density ethylene-alpha-olefin copolymer and an at least one ethylene homopolymer, wherein said ethylene homopolymer is made in a high-pressure polymerization process; and (iii) a blend of said at least one low-density ethylene-alpha-olefin copolymer and an at least one ethylene copolymer, wherein said ethylene copolymer is made in a high-pressure polymerization process;

wherein said multi-layer film thickness is in the range of from about 35 microns to about 66 microns;

wherein a combined thickness of said first at least one interposed layer and said second at least one interposed layer is in the range of from about 10% to about 27% of the total thickness of said multi-layer film;

wherein a combined thickness of said inner sealant-layer and said outer sealant-layer is in the range of from about 10% to about 27% of the total thickness of said multi-layer film.

2. The multi-layer film as recited in claim 1, wherein said multi-layer film thickness is in the range of from about 38 microns to about 63 microns.

3. The multi-layer film as recited in claim 1, wherein said multi-layer film thickness is in the range of from about 44 microns to about 60 microns.

4. The multi-layer film as recited in claim 1, wherein said multi-layer film thickness is in the range of from about 47 microns to about 59 microns.

5. The multi-layer film as recited in claim 1, wherein said multi-layer film thickness is selected from the group consisting of about 45 microns, about 46 microns, about 47 microns, about 48 microns, about 49 microns, about 50 microns, about 51 microns, about 52 microns, about 53 microns, about 54 microns, about 55 microns, about 56 microns, about 57 microns and about 58 microns.

6. The multi-layer film as recited in claim 1, wherein said at least one inner sealant-layer or said at least one outer sealant layer comprises:

(i) from about 80 to about 98 parts by weight of said low-density copolymer of ethylene and an at least one $C_4$-$C_{10}$ alpha-olefin manufactured in a polymerization process using a single-site polymerization catalyst, with a density in the range of from about 0.909 to about 0.935 g/cm$^3$ and a melt-index in the range of from about 0.5 to about 1.5, and (ii) from about 0 to about 15 parts by weight of an additional at least one low-density copolymer of ethylene and an at least one $C_4$-$C_{10}$ alpha-olefin, which is an ultra-low density copolymer of ethylene and at least one $C_4$-$C_{10}$ alpha-olefin manufactured in a polymerization process using a single-site polymerization catalyst, with a density in the range of from about 0.859 to about 0.888 g/cm$^3$ and a melt-index in the range of from about 0.4 to about 0.6 dg/min.

7. The multi-layer film as recited in claim 1, wherein said at least one inner sealant-layer or said at least one outer sealant-layer further comprises from about 0 to about 15 parts by weight of said at least one ethylene homopolymer manufactured in a high pressure polymerization process or said at least one ethylene copolymer manufactured in a high pressure polymerization process, wherein said at least one ethylene homopolymer has a density in the range of from about 0.918 to about 0.923 g/cm$^3$ and a melt-index in the range of from about 0.1 to 1.1 dg/min, and said at least one ethylene copolymer has a density in the range of from about 0.930 to about 0.960 g/cm$^3$ and a melt-index in the range of from about 0.1 to about 10 dg/min.

8. The multi-layer film of claim 6, wherein said low-density copolymer of ethylene and at least one $C_4$-$C_{10}$ alpha-olefin, or said at least one ultra-low density copolymer of ethylene and at least one $C_4$-$C_{10}$ alpha-olefin is selected from ethylene/butene-1 copolymers, ethylene/hexene1 copolymers, ethylene/octene-1 copolymers, ethylene/octene-1/butene1 terpolymers and ethylene/hexene-1/butene-1 terpolymers.

9. The multi-layer film as recited in claim 1, wherein, in said first at least one interposed layer or in said at least second interposed layer:

(i) said at least one polypropylene blend is in the range of from about 70 to about 100 parts by weight of said first at least one interposed layer or of said second at least one interposed layer, wherein said polypropylene blend comprises two components, the first component of said polypropylene blend is a heterogeneous or homogeneous polypropylene interpolymer, or a blend of polypropylene interpolymers with polypropylene homopolymers, wherein each polymer has a melt-index in the range of from about 0.45 to about 0.75 dg/min, wherein the second component of said polypropylene blend is at least one heterogeneous interpolymer of propylene with ethylene, or with ethylene and butene, comprising from about 71 mol % to about 86 mol % propylene and from about 29 mol % to about 14 mol % ethylene, or ethylene and butene, the interpolymer having an overall weight average molecular weight (Mw) of at least about 400,000, a xylene soluble phase of not less than 27 wt %, with the xylene soluble phase having a weight average molecular weight (Mw) of at least about 275,000 and said heterogeneous polypropylene interpolymer has a density of from 0.875 to 0.91 g/cm$^3$;

(ii) said at least one ethylene-alpha olefin copolymer is in the range from 0 to about 15 parts by weight of said first at least one interposed layer or of said second at least one interposed layer, wherein said at least one $C_4$-$C_{10}$ alpha-olefin is an ultra-low density copolymer of ethylene and at least one $C_4$-$C_{10}$ alpha-olefin manufactured in a polymerization process using a single-site polymerization catalyst, with a density in the range of from about 0.859 to about 0.905 g/cm$^3$ and a melt-index in the range of from about 0.4 to about 1.1 dg/min; and (iii) said at least one additional ethylene-alpha-olefin copolymer is in the range of from about 0 parts to 15 parts by weight, and can be manufactured in a polymerization process using either a single-site or Zeigler-Natta polymerization catalyst, wherein said copolymer has a density in the range of from about 0.909 to about 0.935 g/cm$^3$ and a melt-index in the range of from about 0.5 to about 1.5 dg/min.

10. The multi-layer film as recited in claim 9, wherein the polypropylene blend comprises as first component, a heterogeneous polypropylene interpolymer, a homogenous polypropylene interpolymer, or blend of polypropylene interpolymers with homopolymer polypropylenes.

11. The multi-layer film as recited in claim 10, wherein said first component polypropylene is a grade of polypropylene or blend of polypropylenes allowing manufacture of a multi-layer film having a high impact strength, wherein the izod impact strength of the first component polypropylene, or blend of polypropylenes, being greater than 9 ft-lb$_f$ per inch of notch as per American Society for Testing and Materials (ASTM) D256.

12. The multilayer film as recited in claim 10, wherein said second component of said polypropylene blend is an at least one heterogeneous propylene interpolymer of propylene with ethylene, or with ethylene and butene, comprising from about 71 mol % to about 86 mol % propylene and from about 29 mol % to about 14 mol % ethylene, or ethylene and butene, the interpolymer having an overall weight average molecular weight (Mw) of at least about 400,000, a xylene soluble phase of not less than 27 wt %, with the xylene soluble phase having a Mw of at least about 275,000 and said heterogeneous polypropylene interpolymer has a density of from 0.875 to 0.91 g/cm$^3$.

13. The multi-layer film as recited in claim 1, wherein, in said at least one core layer:
  (i) said at least one low density ethylene-alpha olefin copolymer is in the range from 35 to about 85 parts by weight of said at least one core layer, and can be manufactured in a polymerization process using either a single-site or ZeiglerNatta polymerization catalyst, wherein said copolymer has a density in the range of from about 0.909 to about 0.935 g/cm$^3$ and a melt-index in the range of from about 0.5 to about 1.5 dg/min;
  (ii) from 0 to about 15 parts by weight of an additional at least one low-density copolymer of ethylene and an at least one C$_4$-C$_{10}$ alpha-olefin, which is an ultra-low density copolymer of ethylene and at least one C$_4$-C$_{10}$ alpha-olefin manufactured in a polymerization process using a single-site polymerization catalyst, with a density in the range of from about 0.859 to about 0.905 g/cm$^3$ and a melt-index in the range of from about 0.4 to about 1.1 dg/min; and
  (iii) said at least one low-density ethylene homopolymer or copolymer, made in a high pressure polymerization process, is in the range of from about 10 parts to 50 parts by weight of said at least one core layer, wherein the ethylene homopolymer has a density in the range of from about 0.918 to about 0.923 g/cm$^3$ and a melt-index in the range of from about 0.1 to 1.1 dg/min, and the ethylene copolymer has a density in the range of from about 0.930 to about 0.960 g/cm$^3$ and a melt-index in the range of from about 0.1 to about 10 dg/min.

14. The multi-layer film of claim 13, wherein said low-density copolymer of ethylene and at least one C$_4$-C$_{10}$ alpha-olefin, or said at least one ultra-low density copolymer of ethylene and at least one C$_4$-C$_{10}$ alpha-olefin is selected from ethylene/butene1 copolymers, ethylene/hexene1 copolymers, ethylene/octene1 copolymers, ethylene/octene-1/butene1 terpolymers and ethylene/hexene1/butene1 terpolymers.

* * * * *